(12) United States Patent
Takenaka et al.

(10) Patent No.: US 7,801,643 B2
(45) Date of Patent: Sep. 21, 2010

(54) LEGGED MOBILE ROBOT AND CONTROL PROGRAM FOR THE ROBOT

(75) Inventors: Toru Takenaka, Wako (JP); Susumu Miyazaki, Wako (JP); Masakazu Kawai, Wako (JP); Masanori Takeda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 622 days.

(21) Appl. No.: 11/719,163

(22) PCT Filed: Sep. 14, 2005

(86) PCT No.: PCT/JP2005/016892
§ 371 (c)(1),
(2), (4) Date: May 11, 2007

(87) PCT Pub. No.: WO2006/064599
PCT Pub. Date: Jun. 22, 2006

(65) Prior Publication Data
US 2009/0099689 A1    Apr. 16, 2009

(30) Foreign Application Priority Data
Dec. 14, 2004    (JP) .............................. 2004-362080

(51) Int. Cl.
G06F 19/00    (2006.01)
(52) U.S. Cl. .................. 700/245; 180/8.1; 180/8.6; 318/568.11; 318/568.12; 901/1

(58) Field of Classification Search ................ 700/245; 180/8.1, 8.6; 318/565, 568.11, 568.12, 567
See application file for complete search history.

(56) References Cited

U.S. PATENT DOCUMENTS

| | | | |
|---|---|---|---|
| 2002/0183897 A1* | 12/2002 | Kuroki et al. | ............... 700/245 |
| 2003/0120388 A1 | 6/2003 | Kuroki et al. | |
| 2003/0144763 A1* | 7/2003 | Mori et al. | .................. 700/245 |
| 2004/0176875 A1* | 9/2004 | Iribe et al. | .................. 700/245 |
| 2004/0211603 A1* | 10/2004 | Furuta et al. | ................. 180/8.1 |
| 2005/0234593 A1* | 10/2005 | Goswami et al. | ............ 700/245 |

FOREIGN PATENT DOCUMENTS

| | | |
|---|---|---|
| EP | 1 084 943 | 3/2001 |
| JP | 05-305584 | 11/1993 |

(Continued)

OTHER PUBLICATIONS

"Real-Time Arm Trajectory Generation for Yaw Moment Cancellation under Vertical Upper-Body Constraint", Kyong II Kang et al., English abstract included.

*Primary Examiner*—Khoi Tran
*Assistant Examiner*—Stephen Howerda
(74) *Attorney, Agent, or Firm*—Rankin, Hill & Clark LLP

(57) ABSTRACT

A legged mobile robot and a control program for the robot cancel a spin force, which is generated by motions of a lower body (242), a leg (2) or the like, by a twisting motion of an upper body (241) relative to the lower body (242) and a swinging motion of an arm (80).

14 Claims, 15 Drawing Sheets

FOREIGN PATENT DOCUMENTS

| | | |
|---|---|---|
| JP | 05-324115 | 12/1993 |
| JP | 10-086080 | 4/1998 |
| JP | 10-086081 | 4/1998 |
| JP | 10-277969 | 10/1998 |
| JP | 2001-017591 | 1/2001 |
| JP | 2002-210681 | 7/2002 |
| JP | 2004-202652 | 7/2004 |
| WO | 02/40224 | 5/2002 |

* cited by examiner (RUNNING GAIT)

(DESIRED FLOOR REACTION FORCE VERTICAL COMPONENT)

(DESIRED ZMP)

(PROCESSING FOR DETERMINING NORMAL GAIT PARAMETER)

(PERMISSIBLE RANGE OF FLOOR REACTION FORCE HORIZONTAL COMPONENT)

(PROCESSING FOR PROVISIONALLY DETERMINING CURRENT TIME'S GAIT PARAMETER)

(PERMISSIBLE RANGE OF FLOOR REACTION FORCE HORIZONTAL COMPONENT)

FLOOR REACTION FORCE HORIZONTAL COMPONENT PERMISSIBLE LOWER LIMIT VALUE Fxmin
AND FLOOR REACTION FORCE HORIZONTAL COMPONENT PERMISSIBLE UPPER LIMIT VALUE Fxmax (DESIRED FLOOR REACTION FORCE VERTICAL COMPONENT IN WALKING MODE)

(PROCESSING FOR DETERMINING FLOOR REACTION FORCE VERTICAL COMPONENT TRAJECTORY PARAMETER FOR WALKING)

FIG.16
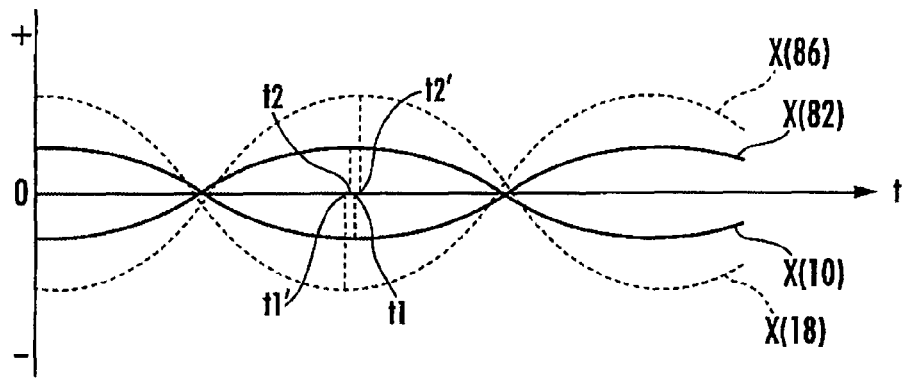
FIG.17(a)  FIG.17(b)  FIG.17(c)
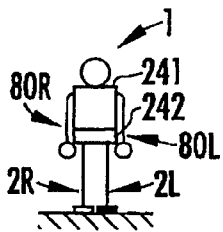 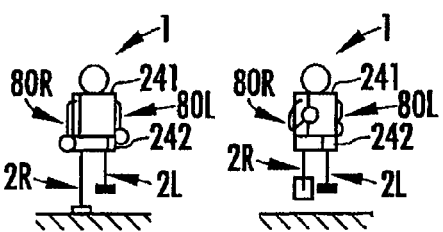 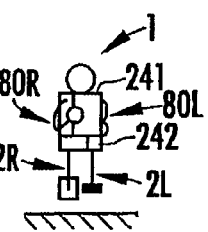
FIG.17(d)  FIG.17(e)  FIG.17(f)
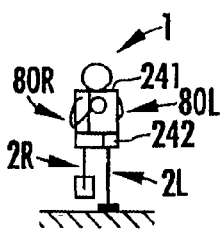 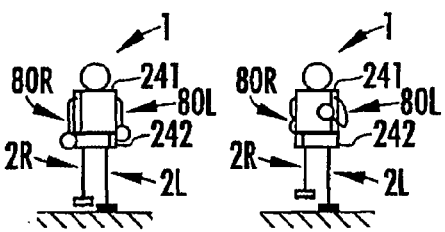 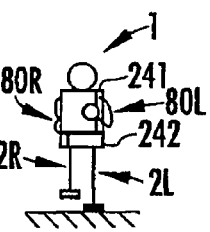
FIG.17(g)  FIG.17(h)
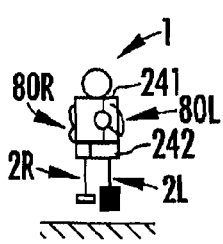 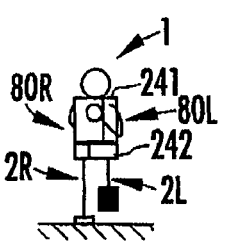

LEGGED MOBILE ROBOT AND CONTROL PROGRAM FOR THE ROBOT

TECHNICAL FIELD

The present invention relates to a legged mobile robot and a control program for the same.

BACKGROUND ART

There has been proposed a technique for twisting the body trunk of a legged mobile robot, which travels (walks) by alternately moving forward its right and left legs extending downward from its body, to increase a stride thereof so as to permit fast walking (refer to, for example, paragraph 0077 and FIG. 24 to FIG. 28 of Japanese Patent Laid-Open Publication No. 2004-202652).

However, as the walking velocity increases, the moment generated in the direction in which the body trunk of the robot is twisted increases. This may lead to lateral wobble in the direction in which the robot is advancing and further cause the robot to spin with resultant instability in a walking motion thereof. In particular, a running motion of the robot, which includes a floating period (=a period in which all legs are in the air), is very likely to become unstable when a leg lands onto a floor.

Accordingly, an object of the present invention is to provide a legged mobile robot capable of maintaining stable motions involved in travel, and a control program for the same.

DISCLOSURE OF INVENTION

The present invention relates to a legged mobile robot which is equipped with upper and lower bodies relatively turnable about a vertical axis, right and left arms extended from the right and left sides of the upper body, and right and left legs extended downward from the lower body, and which advances by moving a first leg predetermined portion, which is located farther toward the distal end than the proximal portion of a first leg is located, to the front from the rear relative to the proximal portion of the first leg and also by moving a second leg predetermined portion, which is located farther toward the distal end than the proximal portion of a second leg is located, to the rear from the front relative to the proximal portion of the second leg during a period from the instant the first leg becomes a free leg to the instant the first leg becomes a supporting leg.

A legged mobile robot in accordance with the present invention to fulfill the aforesaid object is characterized in that a proximal portion of a first leg is moved to the front from the rear relative to a proximal portion of a second leg, a proximal portion of a first arm adjacent to the first leg is moved to the rear from the front relative to a proximal portion of a second arm adjacent to the second leg, a first arm predetermined portion, which is located farther to a distal end than the proximal portion of the first arm is located, is moved to the rear from the front relative to the proximal portion of the first arm, and a second arm predetermined portion, which is located farther toward a distal end than the proximal portion of the second arm is located, is moved to the front from the rear relative to the proximal portion of the second arm during a period from the instant the first leg becomes a free leg to the instant the first leg becomes a supporting leg.

According to the legged mobile robot in accordance with the present invention, during the period from the instant the first leg becomes a free leg to the instant the first leg becomes a supporting leg, the robot is operated such that the proximal portion of the first leg moves to the front from the rear relative to the proximal portion of the second leg, and the proximal portion of the first arm adjacent to the first leg moves to the rear from the front relative to the proximal portion of the second arm adjacent to the second leg. This causes the direction of the twisting motion of the upper body and the direction of the twisting motion of the lower body to be opposite from each other in the aforesaid period.

Further, during the period from the instant the first leg becomes a free leg to the instant the first leg becomes a supporting leg, the robot is operated such that a first arm predetermined portion, which is located farther to a distal end than the proximal portion of the first arm is located, is moved to the rear from the front relative to the proximal portion of the first arm, and a second arm predetermined portion, which is located farther to a distal end than the proximal portion of the second arm is located, is moved to the front from the rear relative to the proximal portion of the second arm. With this arrangement, the right and left arms are swung in the directions for producing a moment in the same direction as the moment produced by the twisting motion of the upper body relative to the lower body in the aforesaid period.

Thus, according to the legged mobile robot in accordance with the present invention, the moment produced due to a twisting motion or the like of the lower body is canceled by the moment produced by a twisting motion of the upper body relative to the lower body and the swinging motions of the arms during the period from the instant the first leg becomes a free leg to the instant the first leg becomes a supporting leg, making it possible to securely prevent the robot from spinning after the first leg becomes a supporting leg. Moreover, stable motions of the robot can be maintained especially when the robot is walking fast or running.

Further, the legged mobile robot according to the present invention is characterized in that the robot is operated such that, as the traveling velocity or the stride of the robot during the period from the instant the first leg becomes a free leg to the instant the first leg becomes a supporting leg increases, a first ratio increases during the aforesaid period, the first ratio being the ratio of the sum of the amount of backward movement of the first arm predetermined portion, whose reference is the proximal portion of the first arm, and the amount of forward movement of the second arm predetermined portion, whose reference is the proximal portion of the second arm, relative to the amount of backward movement of the proximal portion of the first arm, whose reference is the proximal portion of the second arm.

The legged mobile robot in accordance with the present invention is operated such that, as the traveling velocity or the stride of the robot during the period from the instant the first leg becomes a free leg to the instant the first leg becomes a supporting leg increases, the ratio of the moment produced by the swinging motions of the right and left arms relative to the moment produced by the twisting motion of the upper body with respect to the lower body increases. This arrangement makes it possible to securely cancel the moment, which is generated by a twisting motion or the like of the lower body during fast walking or a running motion of the robot, by the moment generated by the twisting motion of the upper body with respect to the lower body and the swinging motions of the arms while suppressing the lateral wobble of the upper body at the same time during the aforesaid period.

Furthermore, the legged mobile robot in accordance with the present invention is characterized in that a motion of the robot is controlled such that, as the traveling velocity or the stride of the robot during the period from the instant the first leg becomes a free leg to the instant the first leg becomes a supporting leg increases, a second ratio increases during the aforesaid period, the second ratio being the ratio of the sum of the amount of forward movement of the first leg predetermined portion, whose reference is the proximal portion of the first leg, and the amount of backward movement of the second leg predetermined portion, whose reference is the proximal portion of the second leg, in relation to the amount of forward movement of the proximal portion of the first leg, whose reference is the proximal portion of the second leg.

According to the legged mobile robot in accordance with the present invention, stable motions of the robot can be maintained by securely cancelling a moment, which is generated by a twisting motion or the like of the lower body, by a moment generated by a twisting motion of the upper body relative to the lower body and swinging motions of the right and left arms, thereby preventing spins, while increasing the traveling velocity or the stride of the robot so as to achieve fast travel.

Further, the legged mobile robot according to the present invention is characterized in that the right and left arms are bent such that the distance from the proximal portion to the distal portion of each of the right and left arms is reduced as the traveling velocity or the stride of the robot increases.

According to the legged mobile robot in accordance with the present invention, the right and left arms are bent such that the distance from the proximal portion to the distal portion of each of the right and left arms is reduced as the traveling velocity or the stride of the robot increases. This arrangement reduces a burden on the proximal portions of the arms as the moving velocities of the right and left arms increase and secures stability of the driving systems of the arms, thus allowing motions of the robot to be stably controlled.

Further, the legged mobile robot in accordance with the present invention is characterized in that the robot is operated such that the time point at which the longitudinal interval between the proximal portion of the first arm and the proximal portion of the second arm reaches a maximum value and the time point at which the longitudinal interval between the first arm predetermined portion and the second arm predetermined portion reaches a maximum value approximate to a first time interval.

Further, according to the legged mobile robot in accordance with the present invention, setting the first time interval on the basis of a traveling mode, including a traveling velocity and a stride, of the robot allows the motions of the robot to be properly controlled from a viewpoint of, for example, bringing the movement of the upper body and the arms of the robot close to the movement of the upper body of a human being.

Further, the legged mobile robot in accordance with the present invention is characterized in that the robot is operated such that the time point at which the longitudinal interval between the proximal portion of the first leg and the proximal portion of the second leg reaches a maximum value and the time point at which the longitudinal interval between the predetermined portion of the first leg and the predetermined portion of the second leg reaches a maximum value approximate to a second time interval.

According to the legged mobile robot in accordance with the present invention, setting the second time interval on the basis of a traveling mode, including a traveling velocity and a stride, of the robot allows the motions of the robot to be properly controlled from a viewpoint of, for example, bringing the movement of the lower body and the arms of the robot close to the movement of the lower body of a human being.

Further, the legged mobile robot in accordance with the present invention is operated such that the time point at which the first leg lands, the time point at which the longitudinal interval between the proximal portion of the first leg and the proximal portion of the second leg reaches a maximum value, and the time point at which the longitudinal interval between the proximal portion of the first arm and the proximal portion of the second arm reaches a maximum value agree with each other.

According to the legged mobile robot in accordance with the present invention, the robot is operated such that the turning direction of the lower body and the turning direction of the upper body are changed when the first leg lands. This makes it possible to cancel a moment generated by the turning motion of the lower body or the upper body when the leg lands, thus permitting further secure prevention of spins of the robot.

The present invention relates to a program which imparts a function for controlling a legged mobile robot, which is equipped with upper and lower bodies relatively turnable about a vertical axis, right and left arms extended from the right and left sides of the upper body, and right and left legs extended downward from the lower body, and which advances by moving a first leg predetermined portion, which is located farther toward the distal end than the proximal portion of a first leg is located, to the front from the rear relative to the proximal portion of the first leg and also by moving a second leg predetermined portion, which is located farther toward the distal end than the proximal portion of a second leg is located, to the rear from the front relative to the proximal portion of the second leg during a period from the instant the first leg becomes a free leg to the instant the first leg becomes a supporting leg, the function being imparted to a computer mounted on the robot.

The control program in accordance with the present invention to fulfill the aforesaid object imparts a function for controlling motions of a robot such that a proximal portion of a first leg is moved to the front from the rear relative to a proximal portion of a second leg, a proximal portion of a first arm adjacent to the first leg is moved to the rear from the front relative to a proximal portion of a second arm adjacent to the second leg, a first arm predetermined portion, which is located farther to a distal end than the proximal portion of the first arm is located, is moved to the rear from the front relative to the proximal portion of the first arm, and a second arm predetermined portion, which is located farther to a distal end than the proximal portion of the second arm is located, is moved to the front from the rear relative to the proximal portion of the second arm during a period from the instant the first leg becomes a free leg to the instant the first leg becomes a supporting leg, the function being imparted to a computer mounted on the robot.

Further, the control program in accordance with the present invention imparts a function for controlling motions of a robot such that, as the traveling velocity or the stride of the robot during the period from the instant the first leg becomes a free leg to the instant the first leg becomes a supporting leg increases, a first ratio increases during the aforesaid period, the first ratio being the ratio of the sum of the amount of backward movement of the first arm predetermined portion, whose reference is the proximal portion of the first arm, and the amount of forward movement of the second arm predetermined portion, whose reference is the proximal portion of the second arm, relative to the amount of backward movement of the proximal portion of the first arm, whose reference is the proximal portion of the second arm, the function being imparted to a computer mounted on the robot.

Further, the control program in accordance with the present invention imparts a function for controlling motions of a robot such that, as the traveling velocity or the stride of the robot during the period from the instant the first leg becomes a free leg to the instant the first leg becomes a supporting leg increases, a second ratio increases during the aforesaid period, the second ratio being the ratio of the sum of the amount of forward movement of a first leg predetermined portion, whose reference is the proximal portion of the first leg, and the amount of backward movement of a second leg predetermined portion, whose reference is the proximal portion of the second leg, relative to the amount of forward movement of the proximal portion of the first leg, whose reference is the proximal portion of the second leg, the function being imparted to a computer mounted on the robot.

Further, the control program in accordance with the present invention imparts a function for controlling motions of a robot such that the right and left arms are bent so that the distance from the proximal portion to the distal portion of each of the right and left arms is reduced as the traveling velocity or the stride of the robot increases, the function being imparted to a computer mounted on the robot.

Further, the control program in accordance with the present invention imparts a function for controlling motions of a robot such that the time point at which the longitudinal interval between the proximal portion of the first arm and the proximal portion of the second arm reaches a maximum value and the time point at which the longitudinal interval between the predetermined portion of the first arm and the predetermined portion of the second arm reaches a maximum value approximate to a first time interval, the function being imparted to a computer mounted on the robot.

Further, the control program in accordance with the present invention imparts a function for controlling motions of a robot such that the time point at which the longitudinal interval between the proximal portion of the first leg and the proximal portion of the second leg reaches a maximum value and the time point at which the longitudinal interval between the first leg predetermined portion and the second leg predetermined portion reaches a maximum value approximate to a second time interval, to a computer mounted on the robot.

Further, the control program in accordance with the present invention imparts a function for controlling motions of a robot such that the time point at which the first leg lands, the time point at which the longitudinal interval between the proximal portion of the first leg and the proximal portion of the second leg reaches a maximum value, and the time point at which the longitudinal interval between the proximal portion of the first arm and the proximal portion of the second arm reaches a maximum value agree with each other, the function being imparted to a computer mounted on the robot.

BRIEF DESCRIPTION OF THE DRAWINGS

FIG. 16 is a motion explanatory diagram of the legged mobile robot in accordance with the present invention.

FIG. 17 provides motion explanatory diagrams of the legged mobile robot in accordance with the present invention.

BEST MODE FOR CARRYING OUT THE INVENTION

The following will explain embodiments of a legged mobile robot and a control program for the same in accordance with the present invention by using the accompanying drawings.

First, the construction of the legged mobile robot to be controlled in accordance with the present invention will be explained by using FIG. 1.

Figure 1:
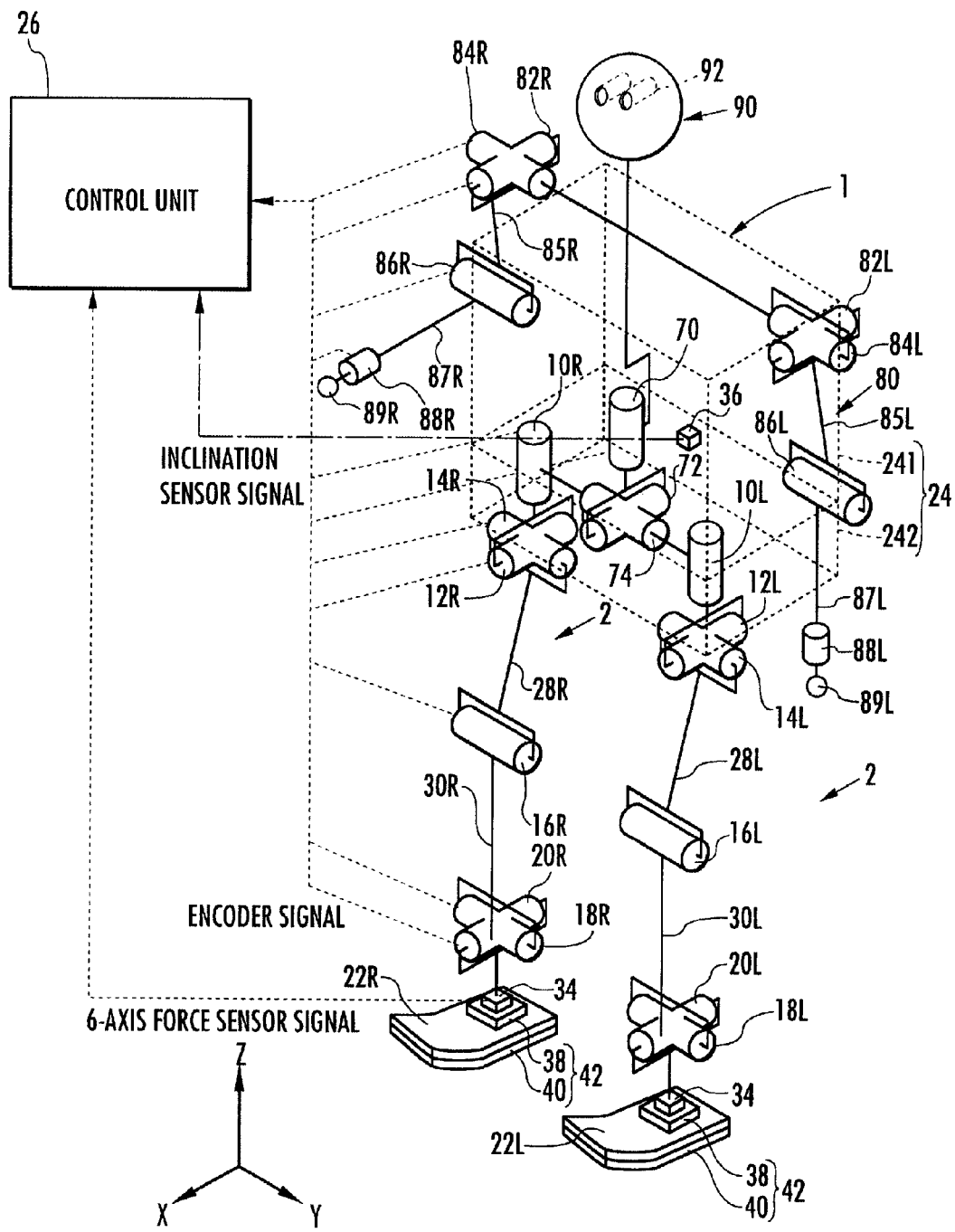
FIG. 1 is a schematic diagram showing an overview of the entire construction of a bipedal mobile robot as a legged mobile robot in an embodiment of the present invention.

A bipedal moving robot (hereinafter referred to as "the robot") 1 shown in FIG. 1 is equipped with a pair of right and left legs (leg links) 2, 2 extended downward from a body 24. The body 24 has an upper body 241 and a lower body 242. The upper body 241 and the lower body 242 are connected by a joint 70 such that they can be relatively turned about a z-axis. Joints 72 and 74 allow the upper body 241 to be inclined relative to the lower body 242 about an x-axis and a y-axis, respectively.

The two legs 2, 2 share the same construction, each having six joints. The six joints are composed of, in the following order from the body 24 side, joints 10R, 10L (the symbols R and L are the symbols meaning that they correspond to the right leg and the left leg, respectively; the same will apply hereinafter) for swinging (rotating) a hip (waist) (for rotating in a yaw direction relative to the body 24), joints 12R, 12L for rotating the hip (waist) in a roll direction (about the x-axis), joints 14R, 14L for rotating the hip (waist) in a pitch direction (about a Y-axis), joints 16R, 16L for rotating knees in the pitch direction, joints 18R, 18L for rotating ankles in the pitch direction, and joints 20R, 20L for rotating the ankles in the roll direction.

A foot (foot portion) 22R(L) constituting a distal portion of each leg 2 is attached to the bottoms of the two joints 18R(L) and 20R(L) of the ankle of each leg 2. The aforesaid body (body) 24 is installed at the uppermost top of the two legs 2, 2 through the intermediary of the three joints 10R(L), 12R(L) and 14R(L) of the hip of each leg 2. A control unit 26 and the like, which will be discussed in detail hereinafter, are housed in the body 24. For the sake of convenience of illustration, the control unit 26 is shown outside the body 24 in FIG. 1.

The control unit 26 is constructed of a CPU, a ROM, a RAM, a signal input circuit, a signal output circuit, and the like as hardware and a "control program" in accordance with the present invention as software for imparting a motion control function of the robot 1 to the hardware.

In each leg 2 having the aforesaid construction, a hip joint (or a waist joint) is formed of the joints 10R(L), 12R(L) and 14R(L), the knee joint is formed of the joint 16R(L), and a foot joint (the ankle joint) is formed of the joints 18R(L) and 20R(L). The hip joint and the knee joint are connected by a thigh link 28R(L), and the knee joint and the foot joint are connected by a crus link 30R(L).

The construction of the legs 2 described above imparts six degrees of freedom to the foot 22R(L) of each leg 2 relative to the body 24. When the robot 1 travels, desired motions of the two feet 22R and 22L can be accomplished by driving 6*2=12 joints of the two legs 2, 2 together ("*" in this description denotes multiplication for scalar calculation, while it denotes an outer product in vector calculation) at appropriate angles. This arrangement enables the robot 1 to freely travel in a three-dimensional space.

A pair of right and left arms 80 is attached to both sides of the upper portion of the body 24, and a head 90 is disposed on the upper end of the body 24. Each arm 80 is equipped with a plurality of joints, which enable the arm 80 to perform a motion, such as swinging back and forth relative to the body 24. The two arms 80 and 80 share the same structure, each having four joints. The four joints consist of, in the order from the one adjacent to the body 24, joints 82R, 82L for rotating shoulders in the roll direction (about the x-axis), joints 84R, 84L for rotating the shoulders in the pitch direction (about the y-axis), joints 86R, 86L for rotating elbows in the pitch direction, and joints 88R, 88L for rotating wrists in the pitch direction. A hand 89R(L) is provided under the joint 88R(L) of the wrist of each arm 80.

In each arm 80, a shoulder joint is comprised of joints 82R(L) and 84R(L), an elbow joint is comprised of the joint 86R(L), and a carpus joint is comprised of the joint 88R(L). Further, the shoulder joint and the elbow joint are connected through the intermediary of an upper arm 85R(L), and the elbow joint and the carpus joint are connected through the intermediary of a lower arm 87R(L).

The head 90 can be rotated about a joint (not shown) relative to the body 24. The head 90 is provided with a camera 92 that takes images around the robot 1.

The position and velocity of the body 24, which will be discussed later in the present description, mean a predetermined position of the body 24, specifically, the position and moving velocity of a representative point determined beforehand (e.g., the central point between the right and left hip joints) of the body 24. Similarly, the positions and velocities of the feet 22R and 22L mean the positions and moving velocities of representative points of the feet 22R and 22L determined beforehand. In this case, in the present embodiment, the representative points of the feet 22R and 22L are set, for example, on the bottom surfaces of the feet 22R and 22L (more specifically, for example, the points at which perpendiculars from the centers of the ankle joints of the individual legs 2 to the bottom surfaces of the feet 22R and 22L intersect with the bottom surfaces).

As shown in FIG. 1, a publicly known 6-axis force sensor 34 is provided under the ankle joints 18R(L), 20R(L) and between the ankle joints and the foot 22R(L) of each leg 2. The 6-axis force sensor 34 detects primarily whether the foot 22R(L) of each leg 2 is in contact with the ground and a floor reaction force (ground contact load) acting on each leg 2, and outputs detection signals of three-direction components Fx, Fy and Fz of a translational force of the floor reaction force and three-direction components Mx, My and Mz of a moment to the control unit 26. Furthermore, the body 24 is equipped with an inclination sensor 36 for detecting an inclination (posture angle) of the body 24 relative to a z-axis (vertical direction (gravitational direction)) and an angular velocity thereof, detection signals thereof being output from the inclination sensor 36 to the control unit 26. Although detailed structures are not shown, each joint of the robot 1 is provided with an electric motor 32 (refer to FIG. 3) for driving the joint and an encoder (rotary encoder) 33 (refer to FIG. 3) for detecting a rotational amount of the electric motor 32 (a rotational angle of each joint). Detection signals of the encoder 33 are output from the encoder 33 to the control unit 26.

Figure 2:
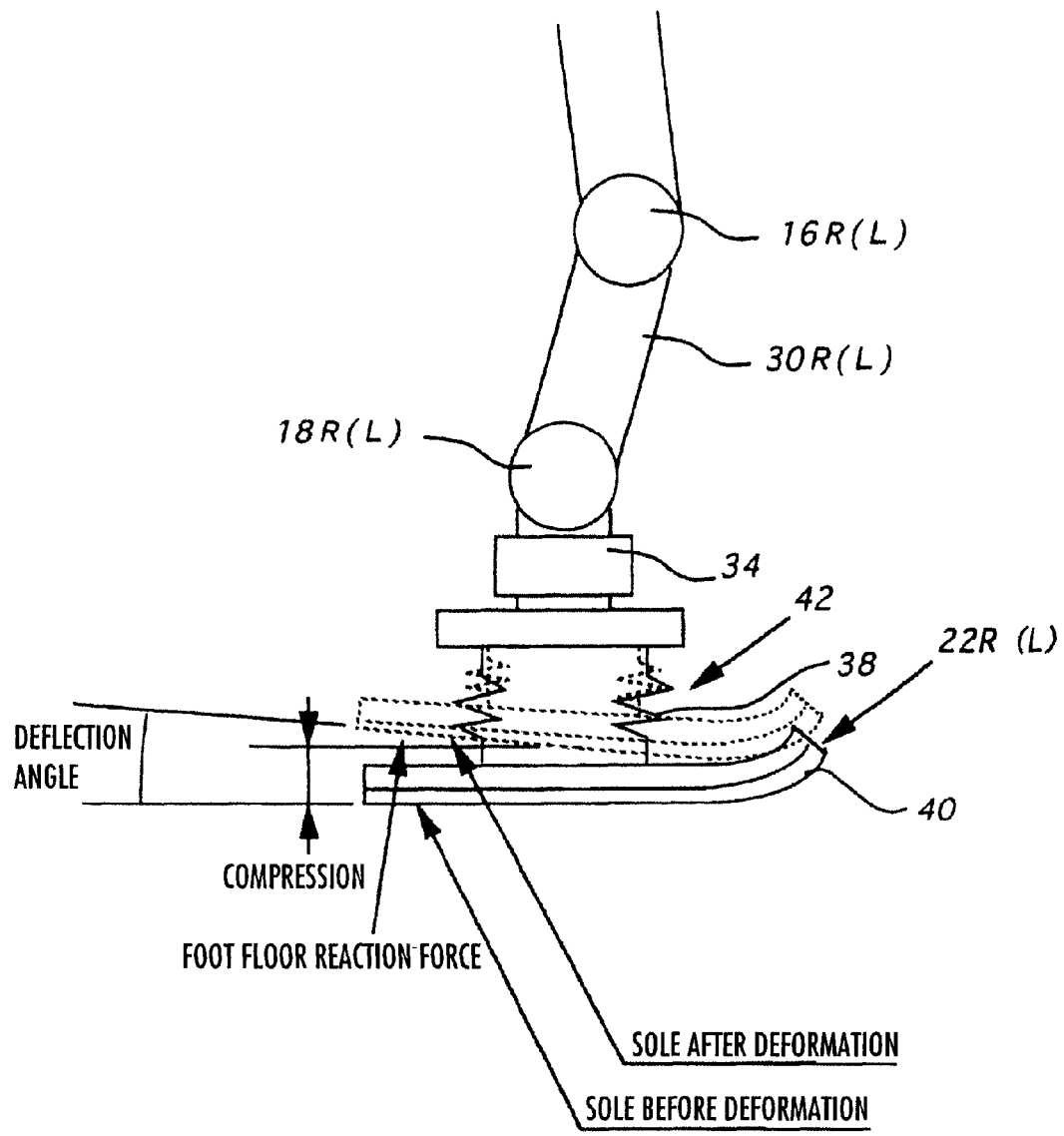
FIG. 2 is a side view showing the construction of a foot portion of each leg of the robot shown in FIG. 1.

As shown in FIG. 2, a spring mechanism 38 is installed between each foot 22R(L) and the aforesaid 6-axis force sensor 34, and a sole elastic member 40 made of rubber or the like is bonded to a sole (the bottom surface of each foot 22R (L)). These spring mechanism 38 and the sole elastic member 40 constitute a compliance mechanism 42. Specifically, the spring mechanism 38 is constructed of a square guide member (not shown), which is installed on the upper surface of the foot 22R(L), and a piston-shaped member (not shown), which is installed adjacently to the ankle joint 18R(L) (the ankle joint 20R(L) being omitted in FIG. 2) and the 6-axis force sensor 34 and housed in the guide member through the intermediary of an elastic member (rubber or spring) so that it may be moved extremely slightly.

The foot 22R(L) indicated by a solid line in FIG. 2 is in a state wherein the foot 22R(L) is being subjected to no floor reaction force. When each leg 2 is subjected to a floor reaction force, the spring mechanism 38 and the sole elastic member 40 of the compliance mechanism 42 flex, causing the foot 22R(L) to shift to the position/posture illustrated by a dashed line in the figure. The structure of the compliance mechanism 42 is important not only to ease a landing impact but also to enhance controllability of the robot 1. The details thereof have been explained in Japanese Patent Laid-Open Publication No. 5-305584 previously proposed by the present applicant, so that detailed explanation will be omitted.

Furthermore, although not shown in FIG. 1, a joystick (operating device) 44 (refer to FIG. 3) for manipulating the robot 1 is provided on the exterior of the robot 1. The joystick 44 is constructed such that a request on a gait of the robot 1, such as a request for turning the robot 1 that is traveling straight, can be input to the control unit 26 as necessary by operating the joystick 44. In this case, requests that can be input include, for example, gait modes (walking, running, etc.) when the robot 1 travels, the landing position/posture or landing time of a free leg, or command data specifying these landing position/posture or landing time (e.g., the traveling direction, traveling velocity or the like of the robot 1).

Figure 3:
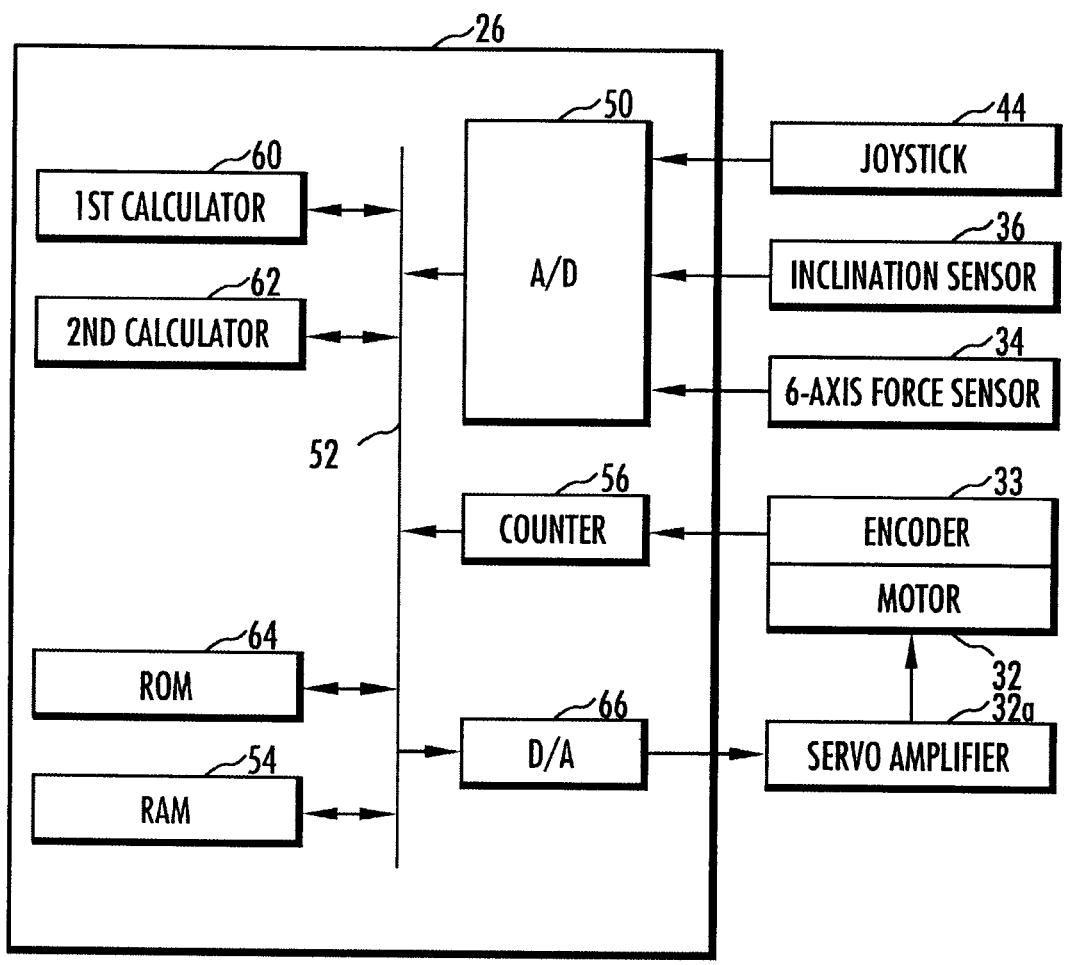
FIG. 3 is a block diagram showing the construction of a control unit provided in the robot shown in FIG. 1.

FIG. 3 is a block diagram showing the construction of the control unit 26. The control unit 26 is comprised of a microcomputer, and includes a first calculator 60 and a second calculator 62 formed of CPUs, an A/D converter 50, a counter 56, a D/A converter 66, a RAM 54, a ROM 64, and a bus line 52 for transferring data among them. In the control unit 26, output signals of the 6-axis force sensor 34 of each leg 2, the inclination sensor 36, the joystick 44, etc. are converted into digital values by the A/D converter 50 and then sent to the RAM 54 via the bus line 52. Outputs of the encoder 33 (rotary encoder) of each joint of the robot 1 are input to the RAM 54 via the counter 56.

As will be discussed hereinafter, the first calculator 60 generates a desired gait, calculates a joint angle displacement command (a command value of a displacement angle of each joint or a rotational angle of each electric motor 32), and sends the calculated command to the RAM 54. The second calculator 62 reads the joint angle displacement command and an actual measurement value of a joint angle detected on the basis of an output signal of the encoder 33 from the RAM 54 to calculate a manipulated variable required for driving each joint and outputs the calculated manipulated variable to the electric motor 32 for driving each joint through the intermediary of the D/A converter 66 and a servo amplifier 32a.

Figure 4:
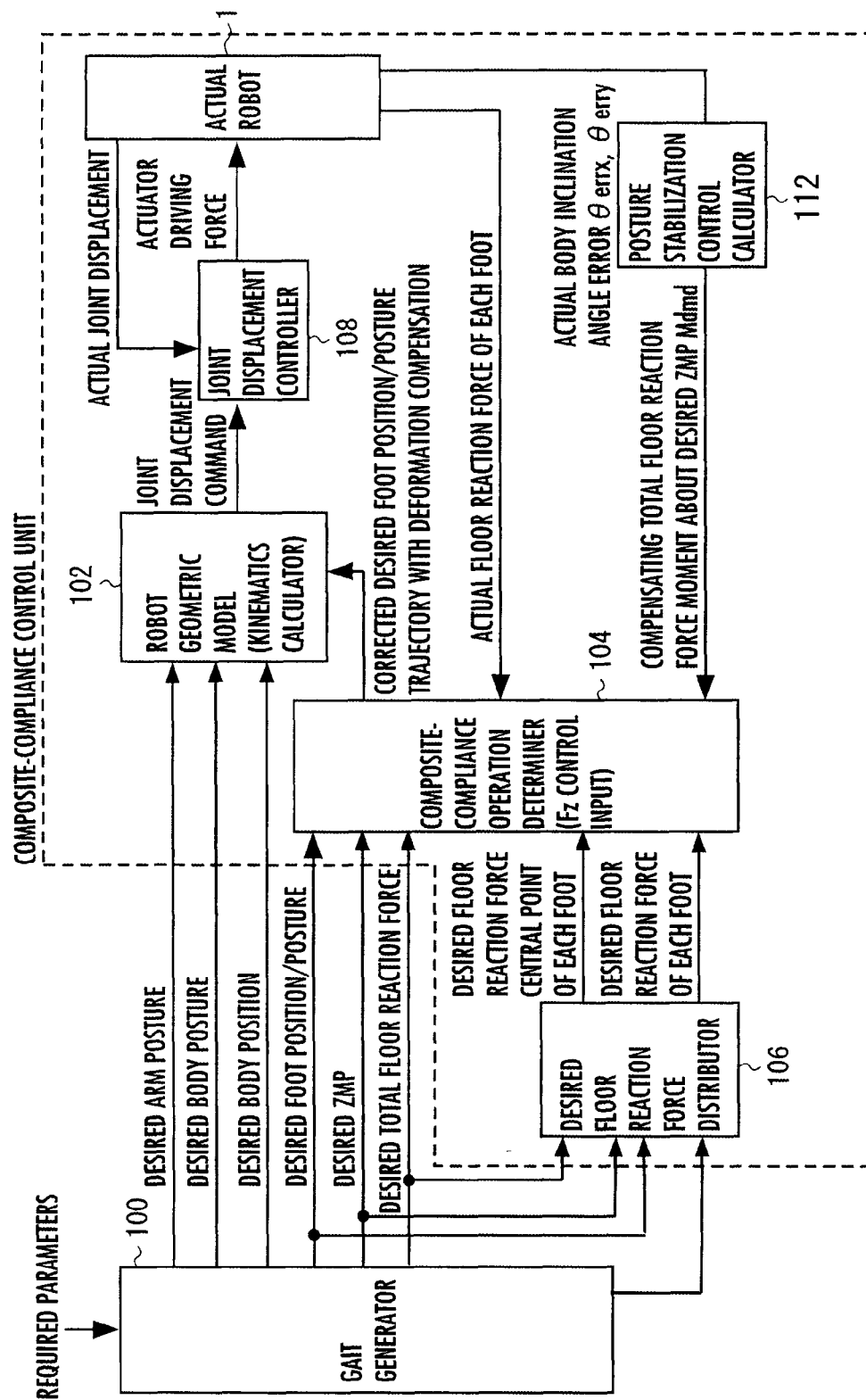
FIG. 4 is a block diagram showing the functional construction of the control unit shown in FIG. 3.

FIG. 4 is a block diagram showing a general view of the functional construction of the gait generator and the control unit of the robot 1 in the present embodiment. A portion except the portion of the "actual robot" in FIG. 4 is constituted of processing functions implemented by the control unit 26 (primarily the functions of the first calculator 60 and the second calculator 62). In the following explanation, the aforesaid symbols R and L will be omitted as long as it is not particularly necessary to discriminate right and left of the legs 2.

An explanation will be given below. The control unit 26 is equipped with a gait generator 100 that generates and outputs desired gaits freely in real time, as it will be discussed later. The gait generator 100 constitutes the means in the invention of the present application by its functions. A desired gait output by the gait generator 100 is constituted of a desired body position/posture trajectory (meaning a trajectory of a desired position and a desired posture of the body 24. The desired posture of the body 24 includes a desired posture of the upper body 241 and a desired posture of the lower body 242), a desired foot position/posture trajectory (the trajectory of a desired position and a desired posture of each foot 22), a desired arm posture trajectory (the trajectory of a desired posture of each arm 80), a desired total floor reaction force central point (desired ZMP) trajectory, and a desired total floor reaction force trajectory. If a portion that can be moved relative to the body 24 is provided in addition to the legs 2 and the arms 80, then a desired position/posture trajectory of the movable portion is added to a desired gait.

Here, the "trajectory" in the aforesaid gait means a temporal change pattern (time series pattern) and it may be referred to as "pattern" in place of "trajectory." Further, the "posture" means a spatial orientation. Specifically, for example, a body posture is represented by an inclination angle (posture angle) of the body 24 in the roll direction (about the x-axis) relative to the z-axis (vertical axis) and an inclination angle (posture angle) of the body 24 in the pitch direction (about the y-axis), and a foot posture is represented by means of a two-axis spatial azimuth fixedly set on each foot 22. In the present description, a body posture may be referred to as a body posture angle.

In the explanation hereinafter, the "desired" will be frequently omitted if there is no danger of misunderstanding. Among gaits, a gait related to constituent elements other than the constituent elements related to a floor reaction force, namely, a gait related to a motion of the robot 1, such as foot position/posture and body position/posture, will be referred generically to as "motions." Further, a floor reaction force acting on each foot 22 (a floor reaction force composed of a translational force and a moment) will be referred to as "the floor reaction force of each foot," and the resultant force of "the floor reaction forces of individual feet" related to all (two) feet 22R and 22L of the robot 1 will be referred to as "the total floor reaction force." However, in the following explanation, the floor reaction force of each foot will be hardly referred to, so that "the floor reaction force" will be handled as synonymous with "the total floor reaction force" unless otherwise specified.

A desired floor reaction force is generally represented in terms of a point of action and a translational force and moment acting on the point. The point of action can be set anywhere, so that innumerable expressions are conceivable for the same desired floor reaction force; if, however, a desired floor reaction force is represented using, in particular, a desired floor reaction force central point (the desired position of the central point of a total floor reaction force) as the point of action, then the moment component of the desired floor reaction force except for a vertical component (the moment about a vertical axis (z-axis)) will be zero. In other words, a horizontal component (the moment about horizontal axes (x-axis and y-axis)) of the moment of the desired floor reaction force about the desired floor reaction force central point will be zero.

In a gait that satisfies a dynamic balance condition, the ZMP calculated from a desired motion trajectory of the robot 1 (the point at which a moment excluding its vertical component becomes zero, the moment acting about the point attributable to the resultant force of the inertial force calculated from the desired motion trajectory and the gravity) coincides with the desired floor reaction force central point. This is, therefore, equivalent to providing a desired ZMP trajectory in place of a desired floor reaction force central point trajectory (for details, refer to, for example, Japanese Patent Application No. 2000-352011 by the present applicant).

With the aforesaid background, in the description of the above Japanese Patent Application No. 2000-352011, a desired gait is defined as follows:

a) A desired gait in a broad sense is a set of a desired motion trajectory and a desired floor reaction force trajectory thereof in a period of one step or a plurality of steps.

b) A desired gait in a narrow sense is a desired motion trajectory and a ZMP trajectory thereof in a one-step period.

c) A series of gaits consists of several connected gaits.

In the walking mode, if a vertical position of the body 24 (body height) of the robot 1 is determined by the body height determining technique previously proposed in Japanese Patent Laid-Open Publication No. H10-86080 by the present applicant, then a translational floor reaction force vertical component is subordinately determined. Furthermore, a translational floor reaction force horizontal component is also determined by determining the body horizontal position trajectory of the robot 1 such that the horizontal component of a moment generated about a desired ZMP by a resultant force of an inertial force attributable to a motion of a desired gait and gravity is zero. Thus, in the description of Japanese Patent Application No. 2000-352011, a desired ZMP alone was adequate as a physical quantity to be explicitly set in relation to a floor reaction force of a desired gait. Accordingly, as the definition of a desired gait in the narrow sense, the one in b) above has been adequate. In comparison thereto, in a running gait (to be described in detail later) of the robot 1 explained in the present embodiment, a floor reaction force vertical component (translational floor reaction force vertical component) is also important in control. For this reason, according to the present invention, a desired trajectory of the floor reaction force vertical component is explicitly set, and then the trajectory of a desired body vertical position or the like of the robot 1 is determined. In the present description, therefore, the following b') is used as the definition of a desired gait in the narrow sense.

b') A desired gait in the narrow sense is a set of a desired motion trajectory and a desired ZMP trajectory thereof and a desired translational floor reaction force vertical component trajectory in a one-step period.

In the present description, hereinafter, for the purpose of easy understanding, a desired gait will be used to mean the desired gait in the narrow sense in b') above unless otherwise specified. In this case, "one step" of a desired gait will be used to mean a period from the instant one leg 2 of the robot 1 lands to the instant the other leg 2 lands. In the following explanation, "a floor reaction force vertical component" will mean "a translational floor reaction force vertical component," and the vertical component (a component about a vertical axis) of the moment in a floor reaction force will use the term "moment" to distinguish it from "a floor reaction force vertical component." Similarly, "a floor reaction force horizontal component" will mean "a translational floor reaction force horizontal component."

Needless to say, a two-leg supporting period in a gait refers to a period during which the robot 1 supports its own weight by the two legs 2L, 2R, a one-leg supporting period refers to a period during which the robot 1 supports its own weight only by one leg 2, and a floating period refers to a period during which both legs 2L, 2R are apart from a floor (floating in the air). In the one-leg supporting period, the leg 2 not supporting the self-weight of the robot 1 is referred to as a "free leg." In a running gait to be explained in the present embodiment, the one-leg supporting period (landing period) and the floating period are alternately repeated, and no two-leg supporting period is included. In this case, during the floating period, both legs 2L, 2P do not support the self-weight of the robot 1; however, the leg 2 that was a free leg and the leg 2 that was a supporting leg during a one-leg supporting period immediately before the floating period will be referred to as a free leg and a supporting leg, respectively, even in the floating period.

An overview of a desired gait generated by the gait generator 100 will be explained, taking the running gait shown in FIG. 5 as an example. Other definitions and details regarding gaits have been described in Japanese Patent Laid-Open Publication No. 10-86081 previously proposed by the present applicant, so that the following explanation will be mainly focused on matters not described in Japanese Patent Laid-Open Publication No. 10-86081.

First, the running gait shown in FIG. 5 will be explained. The running gait is a gait similar to a standard running gait of a human being. In this running gait, the one-leg supporting period during which the foot 22 of only one leg 2 (supporting leg), either the right or left leg, of the robot 1 lands (contacts the ground) and the floating period during which both legs 2L, 2R float in the air are alternately repeated. In FIG. 5, the first state illustrates a state at the beginning (initial state) of a one-leg supporting period, the second state illustrates a state at a midpoint of the one-leg supporting period, the third state illustrates a state at the beginning of a floating period that follows the one-leg supporting period (at the end of the one-leg supporting period), the fourth state illustrates a state at a midpoint of the floating period, and the fifth state illustrates a state at the end of the floating period (at the beginning of the next one-leg supporting period).

Figure 5:
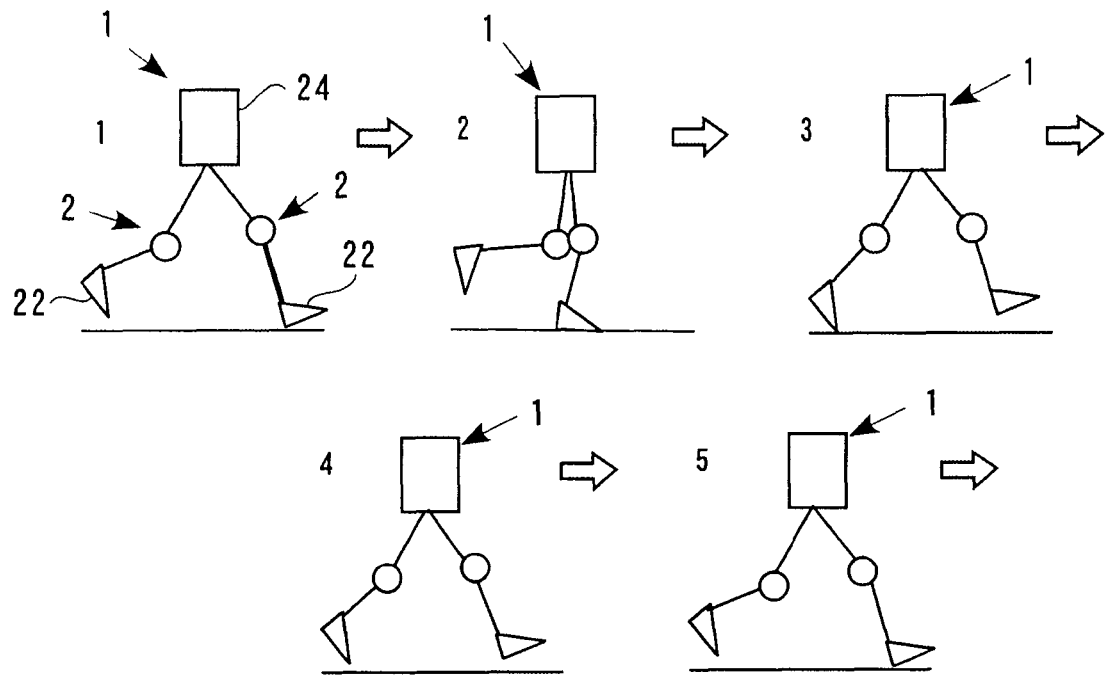
FIG. 5 provides explanatory diagrams illustrating a running gait of the robot shown in FIG. 1.

In the running gait, the robot 1 lands at the heel of the foot 22 of the supporting leg (the leg 2 at the front with respect to the advancing direction of the robot 1) at the beginning of the one-leg supporting period, as shown by the first state in FIG. 5. Subsequently, the robot 1 lands with substantially the entire bottom surface of the landed foot 22 (the foot 22 of the supporting leg) as illustrated by the second state in FIG. 5, then jumps into the air by kicking the floor at the toe of the foot 22 of the supporting leg (the foot 22 of the leg 2 at the rear with respect to the advancing direction of the robot 1 in the third state in FIG. 5) as illustrated by the third state in FIG. 5. Thus, the instant the one-leg supporting period ends, the floating period starts. Incidentally, the free leg in the one-leg supporting period exists at the rear relative to the supporting leg at the start of the one-leg supporting period, as illustrated by the first state in FIG. 5, but it is swung out to the front relative to the supporting leg toward the next expected landing position, as illustrated by the second and the third states in FIG. 5. Subsequently, following the floating period illustrated by the fourth state in FIG. 5, the robot 1 lands at the heel of the foot 22 of the free leg (the leg 2 which was the free leg in the one-leg supporting period immediately before the floating period began), then the next one-leg supporting period is started.

Taking the running gait shown in FIG. 5 into account, a basic outline of a desired gait generated by the gait generator 100 will be given. Although it will be discussed in detail later, when the gait generator 100 generates a desired gait, basic required values (required parameters) for generating a desired gait, such as the landing position/posture (predicted landing position/posture) and landing time (predicted landing time) of the foot 22 of the free leg, are supplied to the gait generator 100 in response to a predetermined operation or the like of the joystick 44. Then, the gait generator 100 generates the desired gait, using the required parameters. More specifically, the gait generator 100 determines a parameter (referred to as a gait parameter) that specifies some constituent elements of the desired gait, including a desired foot position/posture trajectory and a desired floor reaction force vertical component trajectory, of the desired gait on the basis of the aforesaid required parameters. Then, the gait generator 100 sequentially determines instantaneous values of the desired gait, using the gait parameter, and generates a time series pattern of the desired gait.

In this case, the desired foot position/posture trajectory (more specifically, the desired trajectory of spatial components (including x-axis component) of the position and the posture of a foot) is generated for each foot 22 by using, for example, a finite-duration setting filter proposed in U.S. Pat. No. 3,233,450 by the present applicant. This finite-duration setting filter includes a plurality of stages (3 stages or more in the present embodiment) of first-order lag filters of variable time constants, that is, filters represented in terms of a transfer function of $1/(1+\tau s)$ ($\tau$ denotes a variable time constant. Hereinafter, the filter will be referred to as a unit filter), the plurality of stages of the filters being connected in series. This arrangement makes it possible to generate and output a trajectory that reaches a specified value at desired specified time. In this case, time constant $\tau$ of the unit filter of each stage is always variably set in sequence according to remaining time until the above specified time after starting the generation of an output of the finite-duration setting filter. More specifically, the setting is made such that, the value of $\tau$ is decreased from a predetermined initial value (>0) as the remaining time reduces, and the value of $\tau$ finally reaches zero at the specified time at which the remaining time reaches zero. An input of a step of a height based on the specified value (more specifically, the amount of a change from an initial value to the specified value of an output of the finite-duration setting filter) is supplied to the finite-duration setting filter. The finite-duration setting filter not only generates an output that reaches a specified value at specified time but also makes it possible to set a changing rate of an output of the finite-duration setting filter at specified time to zero or substantially zero. Especially when three stages or more (3 stages will do) of the unit filter are connected, the changing acceleration (a differential value of a changing rate) of an output of the finite-duration setting filter can be reduced to zero or substantially zero.

The generation of the foot position/posture trajectory (the position/posture trajectory from the instant the foot 22 lands to the instant the foot 22 lands next) by using the aforesaid finite-duration setting filter is accomplished, for example, as follows. For example, a desired foot position trajectory in the x-axis direction (longitudinal direction) is generated as described below. The height of the step input to the finite-duration setting filter is determined on the basis of the position in the x-axis direction of the next predicted landing position of each foot 22 defined by the aforesaid required parameters (more specifically, an amount of change (travel distance) in the x-axis direction of the next predicted landing position in relation to its immediately preceding landing position; this corresponds to the aforesaid specified value) and the time constant $\tau$ is initialized to a predetermined initial value, and then the determined step input is supplied to the finite-duration setting filter, thus starting the generation of the trajectory of the positions of the foot 22 in the x-axis direction. When generating the trajectory, the time constant $\tau$ is sequentially and variably set such that it reduces from the initial value to zero by the predicted landing time (this corresponds to the aforesaid specified time) of the foot 22. Thus, the trajectory of the positions of the foot 22 in the x-axis direction that allows the predicted landing position to be reached at the predicted landing time is generated.

Further, a desired foot position trajectory in the z-axis direction (vertical direction) is generated, for example, as follows. First, the position of the foot 22 in the z-axis direction where the foot 22 reaches a maximum height (vertical position) (hereinafter referred to as the position of the maximum point) and the time for reaching the position of the maximum point are determined on the basis of the next predicted landing position and the next predicted landing time of the foot 22. Then, after the height of the step input to the finite-duration setting filter is determined on the basis of the position of the maximum point (this corresponds to the aforesaid specified value) and the time constant $\tau$ is initialized, the determined step input is supplied to the finite-duration setting filter to sequentially generate the foot position trajectory in the z-axis direction up to the position of the maximum point. At this time, the time constant $\tau$ is sequentially and variably set such that it reduces from the initial value to zero by the time at which the position of the maximum point is reached (corresponding to the aforesaid specified time). Further, upon completion of the generation of the trajectory of the position in the z-axis direction up to the position of the maximum point, the time constant $\tau$ is initialized and step inputs having opposite polarities from the polarities of the step inputs in the past (more specifically, the reverse-polarity step inputs of height based on the amount of change in the z-axis direction from the position of the maximum point to the next predicted landing position (corresponding to the aforesaid specified value) are input to the finite-duration setting filter so as to sequentially generate the trajectory of the foot position in the z-axis direction from the position of the maximum point to the predicted landing position. At this time, the time constant $\tau$ is sequentially and variably set such that it reduces from the initial value to zero by the predicted landing time of the foot 22.

When generating the foot position trajectory in the z-axis direction, the time constant $\tau$ may be variably set such that it continuously reduces from the initial value to zero until the predicted landing time of the foot 22 from the trajectory generation starting time, and the polarity of step inputs may be switched to the reverse polarity at the time when the position of the maximum point is reached or at time in the vicinity thereof so as to generate a foot position trajectory in the z-axis direction. This allows the foot 22 to reach a predicted landing position at the predicted landing time with no problem although it does not allow the foot 22 to reach a desired position of the maximum point with high accuracy.

The foot posture trajectory can be also generated by using the finite-duration setting filter in the same manner as that for the foot position trajectory described above. In this case, among the spatial components of a foot posture, for the components whose posture angular changes are monotonous (monotonously increase or monotonously decrease), a foot posture trajectory may be generated as in the generation of the foot position trajectory in the x-axis direction described above. For components whose posture angular changes have maximal values or minimal values, a foot posture trajectory may be generated as in the generation of the foot position trajectory in the z-axis direction as described above.

The desired foot position/posture trajectory generated by the finite-duration setting filter, as described above, is the desired position/posture trajectory of each foot 22 in the supporting leg coordinate system fixed to a floor surface, which will be discussed later.

The desired foot position/posture trajectory generated as described above is generated such that the position of each foot 22 begins moving while gradually accelerating toward a predicted landing position from its initial ground contact state (the state at the initial time of a desired gait). And, the desired foot position/posture trajectory is generated such that a position changing velocity gradually decelerates eventually to zero or substantially zero by the predicted landing time, and stops when the predicted landing position is reached at the predicted landing time. Hence, the ground velocity (the changing velocity of the position of each foot 22 in the supporting leg coordinate system fixed to a floor) at the instant when each foot 22 lands becomes zero or substantially zero. Therefore, the landing impact will be small even if all the legs 2 and 2 simultaneously land from the state wherein all the legs are in the air (the state in the floating period) in the running gait.

In the aforesaid running gait, the vertical velocity of the body 24 starts to descend from the latter half of the floating period due to the gravity acting on the robot 1 and remains descending at the time of landing. For this reason, if the desired foot position/posture trajectory of the body 24 is generated such that the ground velocity at the instant each foot 22 lands becomes zero or substantially zero, as described above, and a dynamic balance condition is satisfied, as will be discussed later, then the relative velocity of the foot 22 of a free leg with respect to the body 24 switches to rise immediately before landing. More specifically, at the landing instant in the running gait, the desired gait of the robot 1 becomes a gait in which the leg 22 of the free leg is pulled in toward the body 24 at the landing. In other words, in the desired gait according to the present embodiment, the robot 1 lands in such a manner that it pulls up the foot 22, as observed from the body 24, so that the ground velocity of the foot 22 of the free leg becomes zero or substantially zero at the landing instant. This reduces a landing impact, preventing the landing impact from becoming excessive.

Further, in the present embodiment, the finite-duration setting filter is composed of three stages or more (e.g., three stages) of unit filters connected in series; therefore, the velocity of each foot 22 (the changing velocity of the position of each foot) becomes zero or substantially zero by predicted landing time and, in addition, the acceleration thereof becomes zero or substantially zero and stops at the predicted landing time. This means that the ground acceleration at the landing instant also becomes zero or substantially zero. Hence, the landing impact is further reduced. In particular, an impact will not increase much even if the actual landing time of the robot 1 deviates from desired landing time. Supplementally, the number of stages of the unit filters of the finite-duration setting filter may be two for setting the ground velocity of each foot 22 to zero or substantially zero at predicted landing time; in this case, however, the acceleration of each foot 22 at the predicted landing time will not become zero in general.

A foot posture continues to change until substantially the entire bottom surface of each foot 22 comes in contact with a floor after the foot 22 lands at the heel thereof at the predicted landing time. Thus, the time at which substantially the entire bottom surface of the foot 22 comes in contact with the floor is set as the aforesaid specified time, and a foot posture trajectory is generated by the finite-duration setting filter.

In the present embodiment, the foot position trajectory has been generated using the finite-duration setting filter; alternatively, the desired foot position trajectory may be generated using a function, such as a polynomial expression which has been set such that the changing velocity of the foot position at the predicted landing time becomes zero or substantially zero (the time differential value of the foot position becomes zero) and further, the changing acceleration (time differential value of the changing velocity) of the foot position at the predicted landing time becomes zero or substantially zero. This applies also to the generation of a desired foot posture trajectory. However, regarding the generation of the desired foot posture trajectory, a function, such as a polynomial expression, is set such that the changing velocity of the posture of each foot 22 and also the changing acceleration thereof becomes zero or substantially zero at the time when substantially the entire bottom surface of each foot 22 comes in contact with a floor, as described above.

Figure 6:
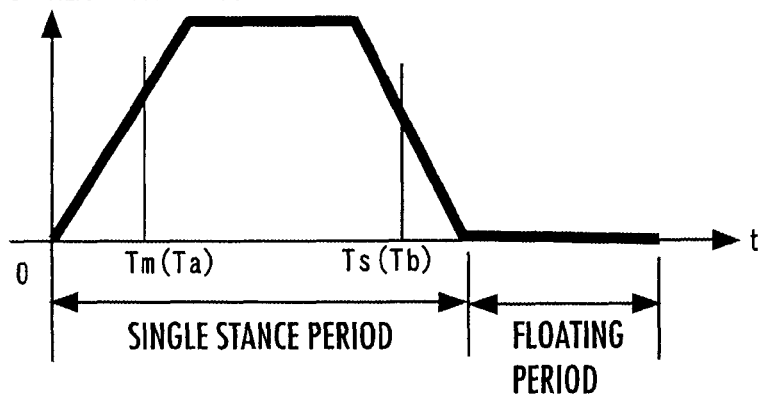
FIG. 6 is a chart showing a setting example of a desired floor reaction force vertical component.

A desired floor reaction force vertical component trajectory is set, for example, as illustrated in FIG. 6. In the present embodiment, the configuration of a desired floor reaction force vertical component trajectory in a running gait (more specifically, the configuration in a one-leg supporting period) is specified to be trapezoidal (shaped to be convex toward the increasing side of a floor reaction force vertical component). The height of the trapezoid and the time of break points are taken as gait parameters that define the desired floor reaction force vertical component trajectory, and the gait parameters (floor reaction force vertical component trajectory parameters) are determined. In a floating period of the running gait, the desired floor reaction force vertical component is steadily set to be zero. As in this example, the desired floor reaction force vertical component trajectory is desirably set so that it is virtually continuous (values are not discontinuous). This is for ensuring smooth motions of joints of the robot 1 when controlling a floor reaction force. Incidentally, "virtually continuous" means that skipped values, which inevitably occur when digitally expressing a trajectory that continues in an analog fashion (continuous trajectory in a true meaning) by means of a discrete-time system, do not lead to loss of the continuity of the trajectory.

A desired ZMP trajectory is set as follows. In the running gait shown in FIG. 5, as described above, the robot 1 lands at the heel of the foot 22 of the supporting leg, then kicks at the toes of the foot 22 of the supporting leg to jump into the air, and lastly lands at the heel of the foot 22 of the free leg.

Figure 7:
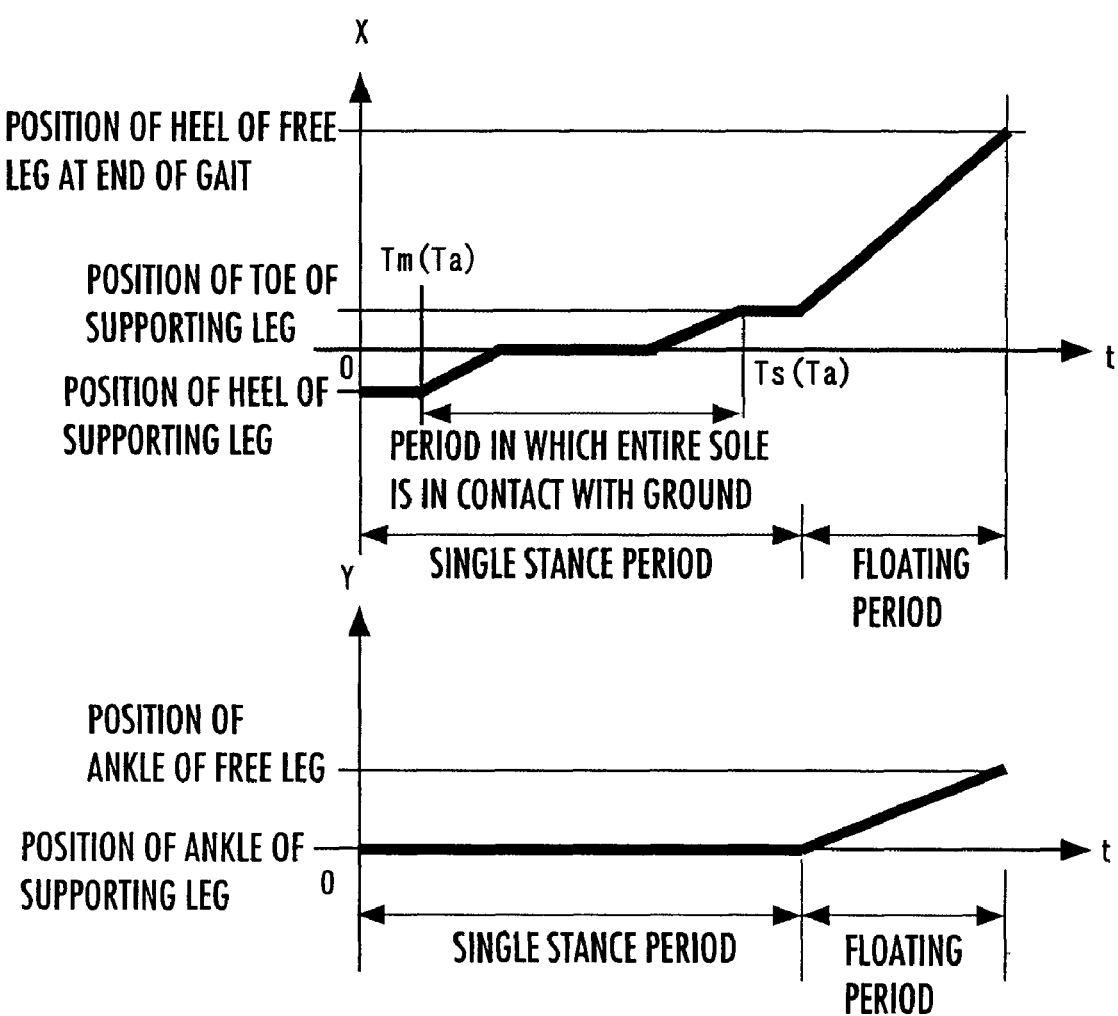
FIG. 7 is a chart showing a setting example of a desired ZMP.

Accordingly, the desired ZMP trajectory in the one-leg supporting period is set such that the ZMP trajectory defines the heel of the foot 22 of the supporting leg as the initial position, then moves to the center in the longitudinal direction of the foot 22 in the period during which substantially the entire bottom surface of the foot 22 of the supporting leg comes in contact with the ground, and thereafter, moves to the toe of the foot 22 of the supporting leg by the leaving-from-floor time, as shown in the upper chart of FIG. 7. Here, the upper chart of FIG. 7 shows a desired ZMP trajectory in the x-axis direction (longitudinal direction), while the lower chart of FIG. 7 shows a desired ZMP trajectory in the y-axis direction (lateral direction). Incidentally, the desired ZMP trajectory in the y-axis direction in the one-leg supporting period is set to the same position as the central position of the ankle joint of the leg 2 of the supporting leg in the y-axis direction, as shown in the lower chart of FIG. 7.

In the running gait, further, after the one-leg supporting period ends, both legs 2 and 2 leave the floor and the floor reaction force vertical component becomes zero. When the floor reaction force vertical component is zero, that is, during a floating period, the total center-of-gravity of the robot 1 performs free fall motions, resulting in no change in the amount of angular motion about the total center-of-gravity. At this time, the moment of the resultant force of the gravity and an inertial force acting on the robot 1 at any point on the floor is zero, so that a desired ZMP is indeterminate. This means that any time point on the floor is "a point of action at which the horizontal component of a moment produced by the resultant force of gravity and an inertial force is zero," which satisfies a condition of ZMP. In other words, setting the desired ZMP at any point will satisfy a dynamic balance condition in which the horizontal component of the moment about the desired ZMP produced by the aforesaid resultant force is zero. Therefore, a desired ZMP may be discontinuously set. For example, the desired ZMP trajectory may be set such that the desired ZMP does not move from a desired ZMP position for leaving from a floor (at the end of a one-leg supporting period) in a floating period, and the desired ZMP position discontinuously moves (in steps), at the terminal end of the floating period, to the desired ZMP position for landing. In the present embodiment, however, as shown in the upper chart of FIG. 7, the position of the desired ZMP trajectory in the x-axis direction in the floating period has been set such that it continuously moves from the landing position of the toe of the foot 22 of the supporting leg to the landing position of the heel of the foot 22 of the free leg by the next landing of the leg 2 of the free leg. Further, as shown in the lower chart of FIG. 7, the position of the desired ZMP trajectory in the y-axis direction in the floating period is set such that it continuously moves from the position in the y-axis direction of the center of the ankle joint of the leg 2 of the supporting leg to the position in the y-axis direction of the center of the ankle joint of the leg 2 of the free leg by the next landing of the leg 2 of the free leg. This means that the desired ZMP trajectory is continuous (virtually continuous) throughout the gait. Further, as will be discussed later, the desired gait is generated (more specifically, the desired body position/posture trajectory is adjusted) such that the moment (excluding the vertical component) of the resultant force of gravity and an inertial force about the desired ZMP becomes zero.

In the present embodiment, the positions and time of the break points of the desired ZMP trajectory, as shown in FIG. 7, are set as the ZMP trajectory parameters (parameters that define the desired ZMP trajectory). The meaning of "virtually continuous" of the ZMP trajectory mentioned above is the same as the case of the aforesaid floor reaction force vertical component trajectory.

The ZMP trajectory parameters are determined such that a high stability allowance is ensured and sudden changes are restrained. Here, a state in which a desired ZMP lies around the center of a minimum convex polygon (so-called supporting polygon) that includes ground contact surfaces of the robot 1 is referred to as a high stability allowance (for details, refer to Japanese Patent Laid-Open Publication No. 10-86081). The desired ZMP trajectory shown in FIG. 7 has been set to satisfy the aforesaid condition.

A desired arm posture is represented by a relative posture with respect to the body 24.

Desired body position/posture, desired foot position/posture, and a reference body posture, which will be discussed hereinafter, are described in terms of a global coordinate system. The global coordinate system is a coordinate system fixed to a floor, as described above. More specifically, a supporting leg coordinate system, which will be discussed hereinafter, is used as the global coordinate system.

The gait generator 100 in the present embodiment defines a desired gait (the desired gait in the aforesaid narrow sense) for one step from the instant one leg 2 of the robot 1 lands to the instant the other leg 2 lands as a unit, and generates the desired gait for one step in order. Accordingly, in the running gait shown in FIG. 5 generated in the present embodiment, the desired gaits are generated in order from the start of a one-leg supporting period to the end of a subsequent floating period (the start of the next one-leg supporting period). Here, a desired gait that is to be generated anew is called a "current time's gait," the next desired gait is called a "next time's gait," and the further next desired gait is called a "next but one time's gait." A desired gait generated immediately preceding the "current time's gait" is called a "last time's gait."

When the gait generator 100 generates a current time's gait anew, required values (requirements) of the predicted landing positions/postures and predicted landing time of the foot 22 of a free leg for the next two steps of the robot 1 are input to the gait generator 100 as the required parameters (or the gait generator 100 reads the required parameters from a storage unit). Then, the gait generator 100 uses these required parameters to generate a desired body position/posture trajectory, a desired foot position/posture trajectory, a desired ZMP trajectory, a desired floor reaction force vertical component trajectory, a desired arm posture trajectory, and the like. At this time, some of the gait parameters defining these trajectories are corrected, as necessary, so as to secure the continuity in walking.

Figure 8:
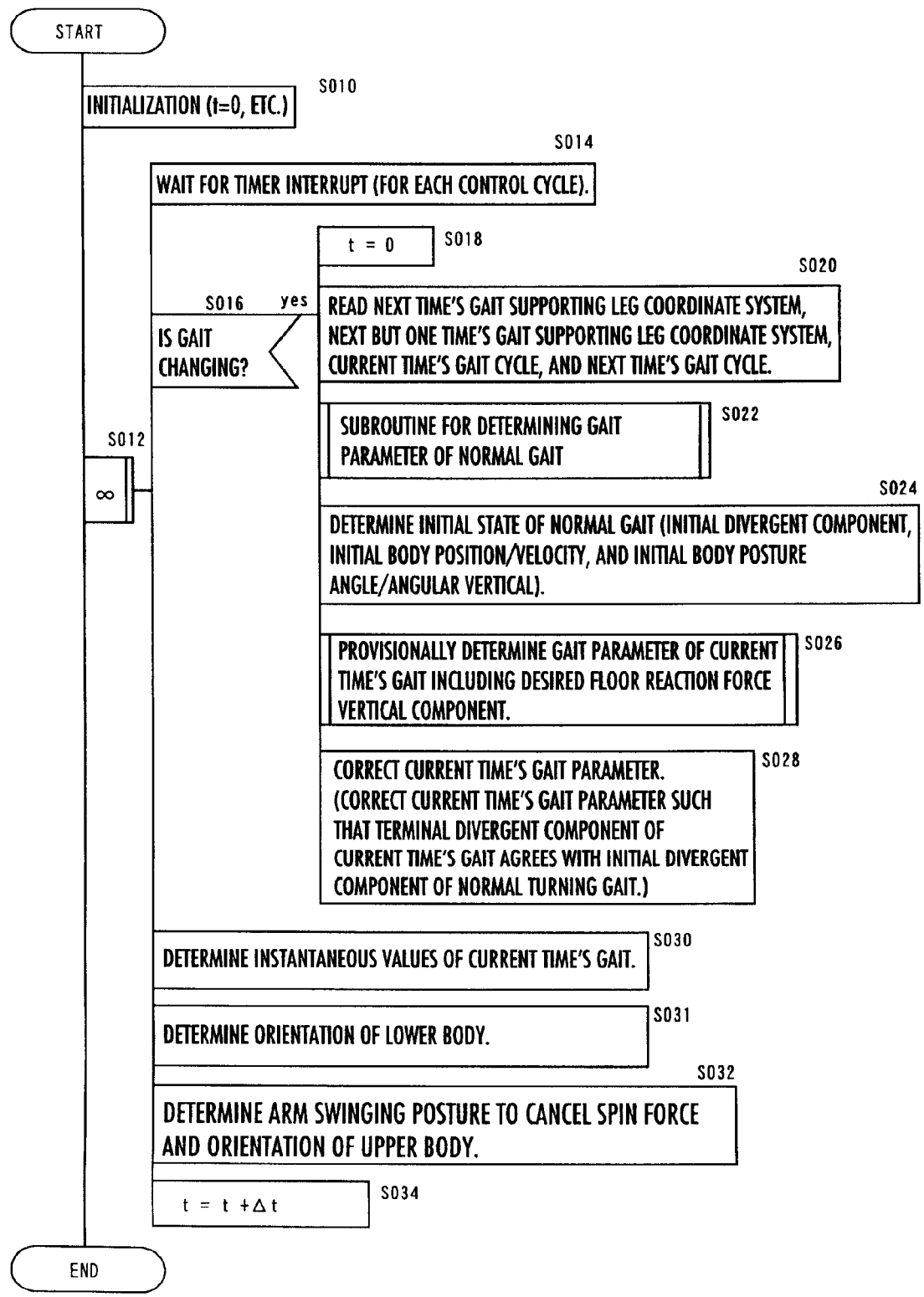
FIG. 8 is a flowchart showing the main routine processing by a gait generator provided in the control unit of FIG. 3.

Referring to FIG. 8 to FIG. 12, the following will explain the details of the processing for generating gaits by the gait generator 100, taking the generation of the running gait shown in FIG. 5 as an example. FIG. 8 is a flowchart (structured flowchart) showing the gait generation processing executed by the gait generator 100.

First, in S010, various types of initializations are performed, including the initialization of time t to zero. This processing is performed when the gait generator 100 is started up or the like. Subsequently, the procedure advances to S014 via S012, and the gait generator 100 waits for a timer interrupt for each control cycle (the calculation processing cycle in the flowchart of FIG. 8). The control cycle is denoted by Δt.

Subsequently, the procedure proceeds to S016 wherein it is determined whether the gait is changing, and if the gait is changing, then the procedure proceeds to S018, or if the gait is not changing, then the procedure proceeds to S030. Here, the aforesaid "the change of a gait" means the timing at which the generation of a current time's gait is begun after the generation of the last time's gait has been completed. For example, a control cycle following the control cycle in which the generation of the last time's gait has been completed is the timing of a gait change.

When the procedure proceeds to S018, time t is initialized to zero, then it proceeds to S020 wherein a next time's gait supporting leg coordinate system, a next but one time's gait supporting leg coordinate system, a current time's gait cycle, and a next time's gait cycle are read. These supporting leg coordinate systems and gait cycles are decided by the aforesaid required parameters. More specifically, in the present embodiment, the required parameters supplied from the joystick 44 or the like to the gait generator 100 include the required values of the predicted landing positions/postures of the foot 22 of a free leg (the foot positions/postures in a state wherein the foot 22 is rotated without a slippage after landing such that substantially the entire sole thereof is in contact with a floor surface) for the next two steps and predicted landing time. The required value of the first step and the required value of the second step are supplied as the ones corresponding to the current time's gait and the next time's gait, respectively, to the gait generator 100 before the generation of the current time's gait begins (at the gait change timing of S016 mentioned above). Incidentally, these required values can be changed in the middle of the generation of the current time's gait.

Then, the next time's gait supporting leg coordinate system is decided on the basis of the required values of the predicted landing position/posture of the first-step foot 22 of the free leg (the foot 22 of the free leg in the current time's gait) in the aforesaid required parameters.

Subsequently, the procedure proceeds to S022 wherein the gait generator 100 determines the gait parameter of a normal turning gait as a virtual cyclic gait that follows the current time's gait. The gait parameter includes a foot trajectory parameter that defines a desired foot position/posture trajectory, a reference body posture trajectory parameter that defines a body posture trajectory providing the reference, an arm trajectory parameter that defines a desired arm posture trajectory, a ZMP trajectory parameter that defines a desired ZMP trajectory, and a floor reaction force vertical component trajectory parameter that defines a desired floor reaction force vertical component trajectory in the normal turning gait. Further, a parameter that defines a desired floor reaction force horizontal component permissible range is also included in the gait parameter.

The "normal turning gait" in the present description is used to mean a cyclic gait that does not develop discontinuity in the motion states (the states of foot position/posture, body position/posture, and the like) of the robot 1 at a boundary of gaits (a boundary of gaits for each step in the present embodiment) when the gait is repeated. Hereinafter, "a normal turning gait" will be abbreviated to "a normal gait" in some cases.

Normal turning gaits are provisionally prepared to determine motion states of the robot 1, such as a divergent component, body vertical position/velocity, a body posture angle and the angular velocity thereof, at the terminating end of the current time's gait in the gait generator 100, and are not directly output from the gait generator 100.

Incidentally, "divergence" means that the position of the body 24 of the bipedal mobile robot 1 is undesirably dislocated to a position that is far apart from the positions of both feet 22 and 22. The value of a divergent component is a numeric value that indicates how far the position of the body 24 of the bipedal mobile robot 1 is apart from the positions of both feet 22 and 22 (more specifically, the origin of the global coordinate system (supporting leg coordinate system) set on the ground contact surface of the foot 22 of a supporting leg).

Figure 9:
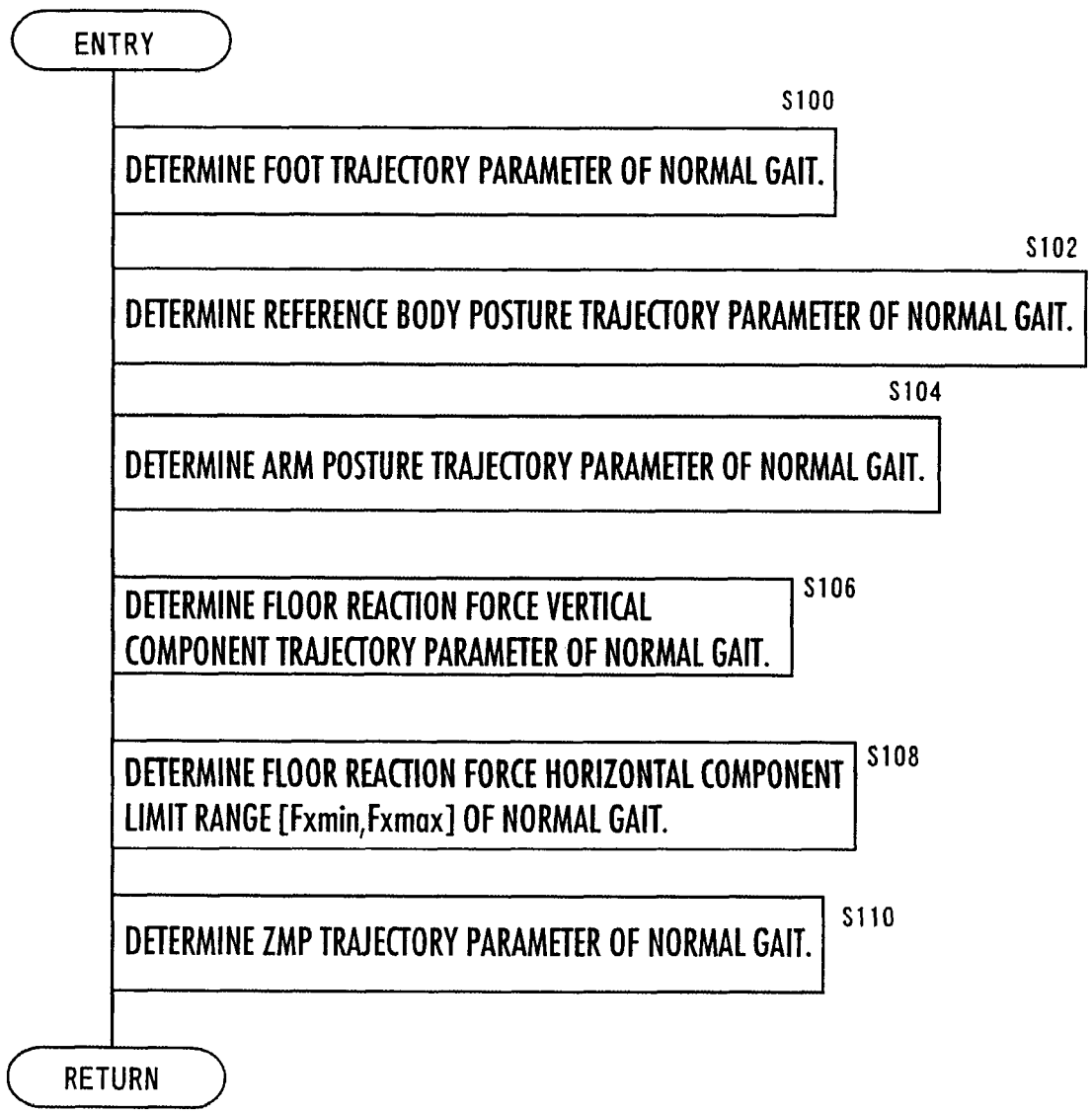
FIG. 9 is a flowchart showing the flowchart subroutine processing of FIG. 8.

Returning to the main subject, in S022, the following processing is carried out according to the flowchart shown in FIG. 9.

First, in S100, a foot trajectory parameter in the gait parameter of the normal gait is determined such that foot position/posture trajectories are connected in the order of a current time's gait, a first turning gait, and a second turning gait. In the explanation hereinafter, the foot 22 of the leg 2 on a supporting leg side will be referred to as a supporting leg foot, while the foot 22 of the leg 2 on a free leg side will be referred to as a free leg foot. Further, "beginning" and "end" of a gait will mean starting time and ending time, respectively, of the gait or instantaneous gaits at those times.

The foot trajectory parameter is composed of the positions/postures of the supporting leg foot and the free leg foot, respectively, at the beginnings and ends, respectively, of the first turning gait and the second turning gait, the gait cycle of each turning gait, and the like. In the foot trajectory parameter, the free leg foot position/posture at the beginning of the first turning gait are defined as the supporting leg foot position/posture at the end of a current time's gait observed from a next time's gait supporting leg coordinate system. In this case, in the running gait, the supporting leg foot 22 at the end of the current time's gait is moving in the air. And the supporting leg foot position/posture at the end of the current time's gait are determined by generating, using the finite-duration setting filter, a foot position/posture trajectory (specifically, a trajectory observed from the next time's gait supporting leg coordinate system) leading from the supporting leg foot position/posture at the beginning of the current time's gait (=the free leg foot position/posture at the end of the last time's gait) to the free leg foot position/posture at the end of the next time's gait, which are determined on the basis of the required values of the predicted landing position/posture of the free leg foot 22 of the second step in the aforesaid required parameters (the required values of the predicted landing position/posture in the next time's gait of the supporting leg foot 22 of the current time's gait) or the next but one time's gait supporting leg coordinate system corresponding to the required values, until the end of the current time's gait.

Subsequently, the procedure proceeds to S102 wherein a reference body posture trajectory parameter that defines the reference body posture trajectory to be followed up by a desired body posture is determined. The reference body posture does not have to be a constant posture as long as it is set to connect at the beginning of the normal gait (the beginning of the first turning gait) and at the end thereof (the end of the second turning gait) (such that the posture angle and its angular velocity of the reference body posture at the beginning of the normal gait agrees with those at the end thereof); however, in the present embodiment, for easier understanding, the reference body posture is set to be an upright posture (vertical posture). This means that, in the present embodiment, the reference body posture is set to the upright posture throughout a normal gait. Thus, in the present embodiment, the angular velocity and the angular acceleration of a posture angle of the reference body posture are zero.

Subsequently, the procedure proceeds to S104 wherein arm posture trajectory parameters, more specifically, arm posture trajectory parameters other than those related to changes in the amounts of angular motions of both arms about a vertical axis (or a body trunk axis) are determined. For example, arm posture trajectory parameters, such as the relative height of the hand of an arm and the relative position of the center-of-gravity of an entire arm with respect to the body 24, are determined. In the present embodiment, the relative position of the center-of-gravity of the entire arm is set such that it is maintained constant with respect to the body.

Subsequently, the procedure proceeds to S106 wherein floor reaction force vertical component trajectory parameters are set. In this case, the floor reaction force vertical component trajectory parameters are set such that the floor reaction force vertical component trajectory defined by the parameters is virtually continuous (values are not skipped in steps), as shown in FIG. 6, in both the first turning gait and the second turning gait. According to the pattern, in both the first turning gait and the second turning gait, the floor reaction force vertical component in a one-leg supporting period changes in a trapezoidal pattern, while the floor reaction force vertical component is maintained at zero in a floating period. And, the time of break points of the pattern and the heights (peak values) of the trapezoidal portions are set as the floor reaction force vertical component trajectory parameters.

Figure 10:
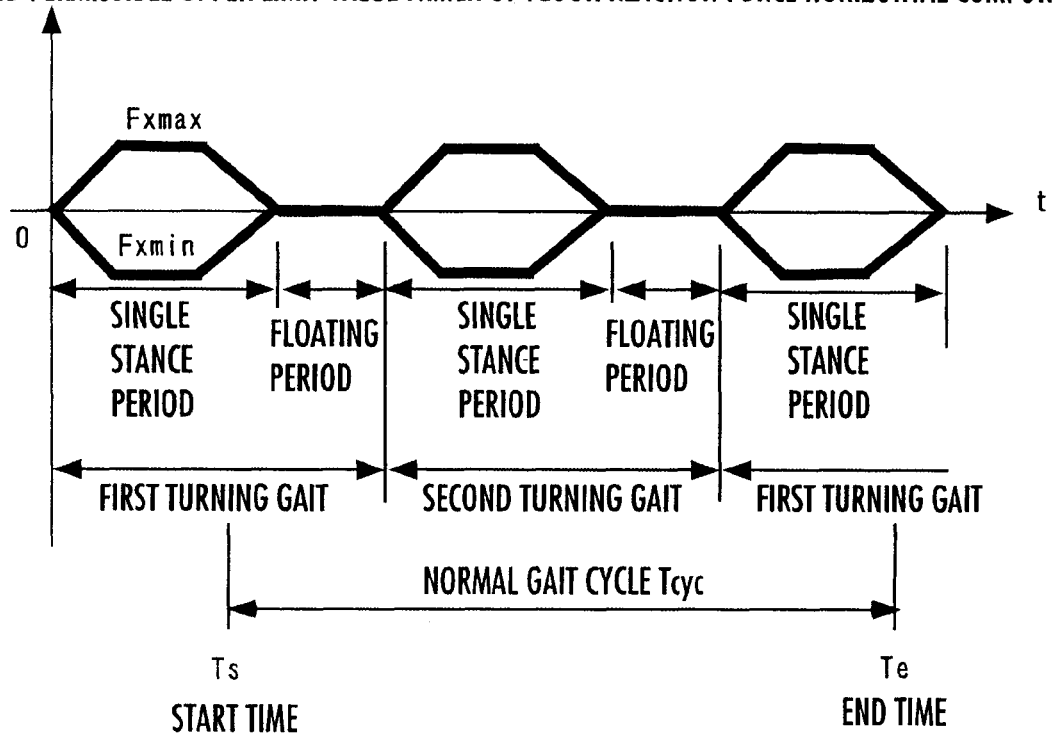
FIG. 10 is a chart showing a setting example of a floor reaction force horizontal component permissible range of a normal gait.
Figure 11:
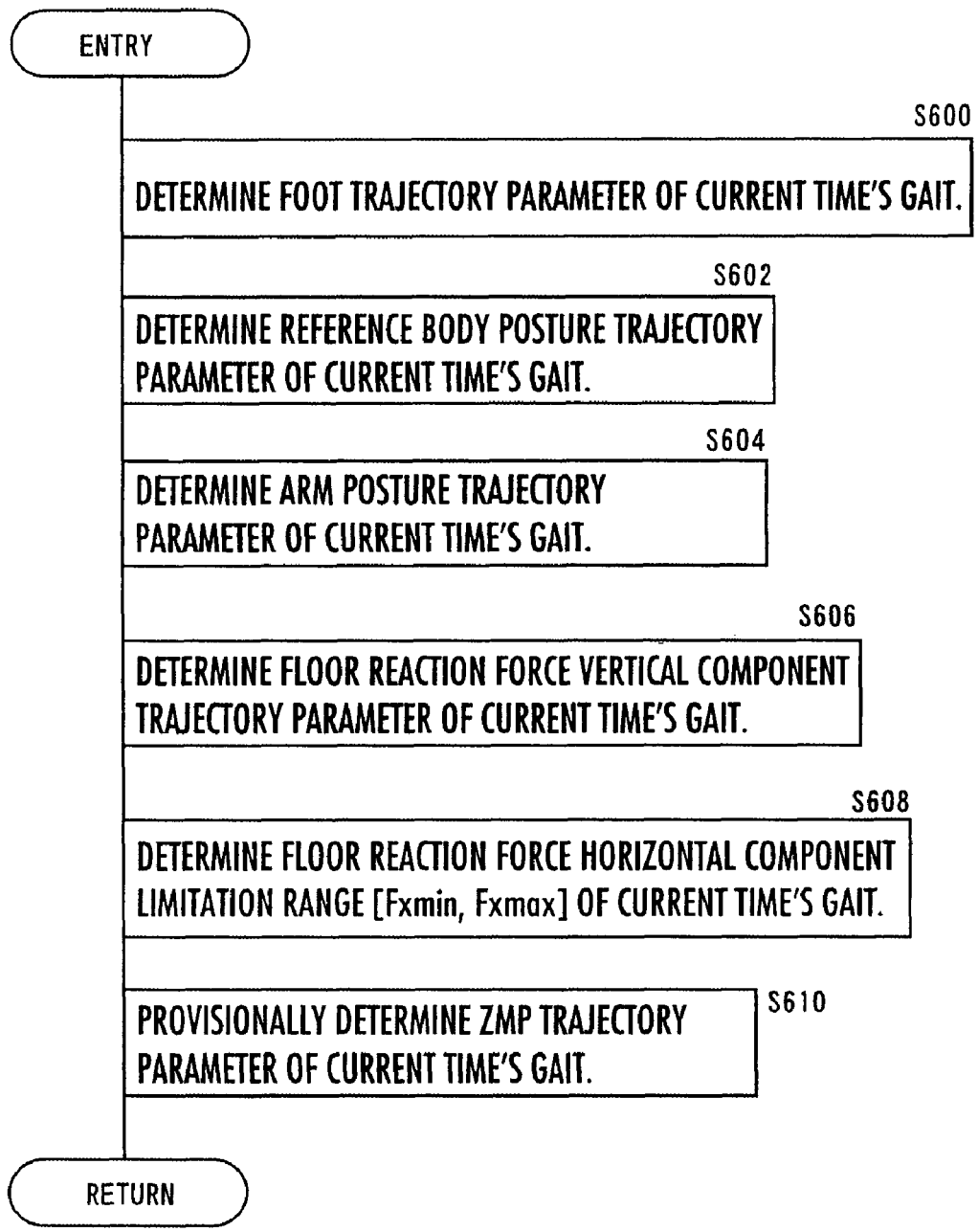
FIG. 11 is a flowchart showing the subroutine processing of the flowchart of FIG. 8.

Subsequently, the procedure proceeds to S108 wherein the permissible range [Fxmin,Fxmax] of floor reaction force horizontal component (more specifically, the parameters that define this) is set, as shown in FIG. 10, on the basis of the floor reaction force vertical component trajectory set as described above. The broken line on the negative side in FIG. 10 indicates the permissible lower limit value Fxmin of the floor reaction force horizontal component, while the broken line on the positive side indicates the permissible upper limit value Fxmax of the floor reaction force horizontal component. The method for setting them will be supplementally explained below. The following will explain a case where a floor surface is horizontal.

The floor reaction force horizontal component occurs due to friction between a floor and the foot 22; however, friction that occurs is limited rather than being limitless. Hence, in order to prevent the actual robot 1 from slipping when it travels according to a desired gait that has been generated, the floor reaction force horizontal component of the desired gait must always lie within a friction limit. Therefore, in order to satisfy the condition, it has been decided to set a floor reaction force horizontal component permissible range and to generate a desired gait such that the floor reaction force horizontal component of the desired gait lies within the permissible range, as will be discussed later.

If the coefficient of friction between a floor and the foot 22 is denoted by $\mu$, then Fxmin must be always set to be not less than $-\mu$*floor reaction force vertical component, while Fxmax must be set to be not more than $\mu$*floor reaction force vertical component. A simplest setting method is to set according to the expressions given below, where ka denotes a positive constant which is smaller than 1.

$$Fx\min = -ka*\mu*\text{Floor reaction force vertical component}$$

$$Fx\max = ka*\mu*\text{Floor reaction force vertical component} \quad \text{Expression 12}$$

The floor reaction force horizontal component permissible range in FIG. 10 is an example that has been set according to Expression 12. As the parameters defining a floor reaction force horizontal component permissible range, the values and time of break points of the trapezoidal wave pattern or the like of FIG. 10 may be set. When determining a floor reaction force horizontal component permissible range according to Expression 12, the values of (ka*$\mu$) in Expression 12 may be merely set as the parameters.

Subsequently, the procedure proceeds to S110 wherein ZMP trajectory parameters that define the ZMP trajectory of the normal gait combining the first turning gait and the second turning gait are set. In this case, a desired ZMP trajectory is set such that it provides a high stability allowance and develops no sudden changes, as described above.

To be more specific, in the running gait shown in FIG. 5, after a while following the landing at the heel of the supporting leg foot 22, substantially the entire bottom surface of the supporting leg foot 22 comes in contact with the ground, and then after a while, only the toe of the supporting leg foot 22 comes in contact with the ground. Then, the robot 1 jumps into the air by kicking at the toe of the supporting leg foot 22, and lastly lands at the heel of the free leg foot 22. A desired ZMP must lie within a ground contact plane. According to the present embodiment, therefore, the positions of the desired ZMPs in the x-axis direction of the first turning gait and the second turning gait, respectively, of the normal gait are set such that they define the heel of the supporting leg foot 22 as their initial position and remain at the position until substantially the entire bottom surface of the foot 22 comes in contact with the ground, as shown in the upper chart of FIG. 7 described above. Then, the desired ZMPs are set such that the desired ZMPs move to the center of the supporting leg foot 22, and move to the toe by the time the foot 22 comes in contact with the ground at the toes thereof, and then remain at the toe of the supporting leg foot 22 until the foot 22 leaves the floor. After that, the desired ZMPs are set such that the desired ZMPs continuously move from the toe of the supporting leg foot 22 to the landing position of the heel of the free leg foot 22 by the time the free leg foot 22 lands next, as described above. And, the time and positions of the break points of the desired ZMP trajectory are set as the ZMP trajectory parameters. In this case, the time of the break points is set on the basis of the gait cycles of the first turning gait and the second turning gait determined on the basis of the aforesaid required parameters, while the positions of the break points are set on the basis of the required values of the predicted landing positions/postures of the free leg feet of the first step and the second step of the required parameters that define the positions/postures on the next time's gait supporting leg coordinate system and the next but one time's gait supporting leg coordinate system or these coordinate systems. The position of the ZMP trajectory in the y-axis direction is set to be the same as that shown in the lower chart of FIG. 7 described above. More specifically, the trajectory of the positions of the desired ZMP in the y-axis direction in the first turning gait is set in the same pattern as that in the lower chart of FIG. 7, and the trajectory of the positions of the desired ZMP in the y-axis direction in the second turning gait is set to be a trajectory which has the same shape as that of the first turning gait and connects to the terminating end of the trajectory.

After the processing shown in S010 to S022 of FIG. 8 is carried out, the procedure proceeds to S024 wherein an initial state of the normal gait is calculated. The initial state calculated here includes an initial body horizontal position/velocity (the initial body position and the initial body velocity in the horizontal direction), an initial body vertical position/velocity (the initial body position and the initial body velocity in the vertical direction), an initial divergent component, and an initial body posture angle and its angular velocity of the normal gait. This calculation of the initial state is exploratorily implemented.

Subsequently, the procedure proceeds to S026 of FIG. 8 wherein a gait parameter of the current time's gait is determined (partly provisionally determined). In S026, more specifically, the following processing is carried out according to the flowchart shown in FIG. 11.

First, in S600, the foot trajectory parameters of the current time's gait are set such that the foot position/posture trajectory of the current time's gait connects to the foot position/posture trajectory of the normal gait.

Subsequently, the procedure proceeds to S602 wherein the reference body posture trajectory parameters of the current time's gait are determined as with the first turning gait or the second turning gait of a normal gait. The aforesaid parameters, however, are set such that the reference body posture trajectory of the current time's gait continuously connects to the reference body posture trajectory of the aforesaid normal gait (the reference body posture angle and the angular velocity at the end of the current time's gait agrees with the reference body posture angle and the angular velocity, respectively, at the beginning of the normal gait). In the present embodiment, the reference body posture is a steady vertical posture in both the current time's gait and the normal gait.

Subsequently, the procedure proceeds to S604 wherein the arm posture trajectory parameters of the current time's gait are determined as with the first turning gait or the second turning gait of the normal gait. The aforesaid parameters, however, are set such that the arm posture trajectory of the current time's gait continuously connects to the arm posture trajectory of the aforesaid normal gait. The arm posture trajectory parameters determined here are the motion parameters other than those related to changes in the angular motion amounts of both arms about the vertical axis (or the body trunk axis) and are the motion parameters that define the trajectories of the positions of the centers-of-gravity of both arms, as in the case of determining the normal gait parameters (S104 in FIG. 9).

Subsequently, the procedure proceeds to S606 wherein the floor reaction force vertical component trajectory parameters of the current time's gait are set such that the floor reaction force vertical component trajectory defined by the parameters becomes a virtually continuous trajectory (the values are not skipped in steps), as shown in FIG. 6 described above, as with the first turning gait or the second turning gait of a normal gait.

However, the floor reaction force vertical component trajectory parameters are determined such that both the total center-of-gravity vertical position/velocity and the floor reaction force vertical component trajectory of the current time's gait continuously connect to the normal gait.

Figure 12:
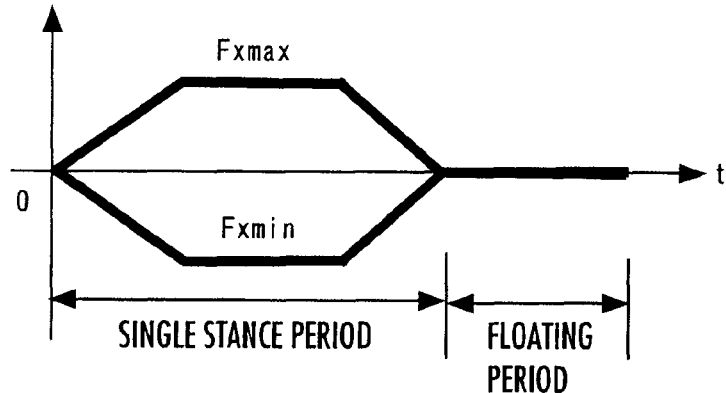
FIG. 12 is a chart showing a setting example of a floor reaction force horizontal component permissible range of a current time gait.

Subsequently, the procedure proceeds to S608 wherein the floor reaction force horizontal component permissible range [Fxmin, Fxmax] (specifically, the parameter that defines the pattern of the floor reaction force horizontal component permissible range) is set as with the first turning gait or the second turning gait of the normal gait. The floor reaction force horizontal component permissible range is set to have, for example, the pattern as shown in FIG. 12. In the present embodiment, the floor reaction force horizontal component permissible range is set on the basis of the aforesaid Expression 12 according to the floor reaction force vertical component pattern previously determined in S606.

Subsequently, the procedure proceeds to S610 wherein the ZMP trajectory of the current time's gait (specifically, the parameters that define the ZMP trajectory, including the time and positions of break points of the trajectory) is set, as shown in aforesaid FIG. 7, such that the ZMP trajectory exhibits a high stability allowance and develops no sudden changes, as with the first turning gait or the second turning gait of the normal gait. The aforesaid parameters, however, are set such that the ZMP trajectory of the current time's gait continuously connects to the ZMP trajectory of the normal gait. In other words, the ZMP trajectory parameters are determined such that the position of the ZMP at the end of the current time's gait coincides with the ZMP position at the beginning of the normal gait. In this case, for a running gait, the time and positions of the break points of the ZMP trajectory in a one-leg supporting period may be set in the same manner as that for setting the ZMP trajectory parameters of the normal gait described above. Further, the ZMP trajectory parameters may be set such that a desired ZMP trajectory in a floating period linearly changes in succession from the beginning of the floating period to the ZMP position at the beginning of the normal gait.

The ZMP trajectory parameters of the current time's gait determined in S610 are merely provisional and will be corrected, as will be discussed later. For this reason, the ZMP trajectory of the current time's gait that has been set as described above will be referred to as the provisional desired ZMP trajectory of the current time's gait.

Returning to the explanation of FIG. 8, the procedure carries out the processing shown in S026 (the processing for determining the gait parameter of the current time's gait), as described above, and then proceeds to S028 wherein the gait parameters (ZMP trajectory parameters) of the current time's gait are corrected. In this processing, the ZMP trajectory parameters are corrected to make the body position/posture trajectory continue or approach to the normal gait.

Returning to FIG. 8, after the current time's gait parameters are corrected in S028, as described above, or if a determination result in S016 is NO, then the procedure proceeds to S030 wherein the instantaneous value of the current time's gait is determined.

Subsequently, the procedure proceeds to S031 wherein the orientation of the lower body 242 is determined.

Next, the procedure proceeds to S032 wherein the swinging postures of the arms 80 and the orientation of the upper body 241 for cancelling a spin force (for setting a floor reaction force moment vertical component generated about a desired ZMP due to the motions of portions other than the arms 80 and the upper body 241 (the lower body 242, the legs 2, and the like) of the robot 1 to approximately zero) are determined.

However, regarding the swinging motions of the arms 80, the right and left arms are swung in longitudinally opposite directions from each other such that the positions of the centers-of-gravity of both arms remain unchanged. As an alternative, a twisting motion of the upper body 241 and the swinging motions of the arms 80 for cancelling a spin force may be generated beforehand in a normal gait, and a twisting motion of the upper body 241 and swinging motions of the arms 80 in the current time's gait may be determined such that they connect to those of the normal gait.

The present invention is characterized in that a stable motion of the robot 1 is ensured by canceling a spin force, which is produced by motions of the lower body 241 or the legs 2 or the like, by a twisting motion of the upper body 241 and the swinging motions of the arms 80. This aspect will be described in detail hereinafter.

Subsequently, the procedure proceeds to S034 wherein time t for generating a gait is incremented by Δt, then returns to S014 to continue generating the gait, as described above.

This concludes the explanation of the processing for generating a desired gait in the gait generator 100.

Referring to FIG. 4, the operations of devices according to the present embodiment will be further explained. In the gait generator 100, a desired gait is generated, as described above. In the generated desired gait, desired body position/posture (trajectory) and desired arm postures (trajectories) are sent out to a robot geometric model (inverse kinematics calculator) 102.

Further, desired foot positions/postures (trajectories), a desired ZMP trajectory (desired total floor reaction force central point trajectory), and a desired total floor reaction force (trajectory) (a desired floor reaction force horizontal component and a desired floor reaction force vertical component) are sent to a composite compliance operation determiner 104 and also to a desired floor reaction force distributor 106. Then, in the desired floor reaction force distributor 106, a floor reaction force is divided between the feet 22R and 22L, and a desired floor reaction force central point of each foot and a desired floor reaction force of each foot are determined. The desired floor reaction force central point of each foot and the desired floor reaction force of each foot that have been determined are sent to the composite compliance operation determiner 104.

The composite compliance operation determiner 104 sends corrected desired foot position/posture (trajectory) with deformation compensation to the robot geometric model 102. Upon receipt of the desired body position/posture (trajectory) and the corrected desired foot position/posture (trajectory) with deformation compensation, the robot geometric model 102 calculates joint displacement commands (values) of twelve joints (including 10R(L)) of the legs 2 and 2 that satisfy them, and sends the calculation results to a displacement controller 108. The displacement controller 108 carries out follow-up control on the displacements of the twelve joints of the legs of the robot 1 (the values of the encoder 33 provided in the motor 32 for driving joints), using the joint displacement commands (values) calculated by the robot geometric model 102 as the desired values. In addition, the robot geometric model 102 calculates the displacement commands (values) of the arm joints that satisfy the desired arm postures and sends the calculated commands (values) to the displacement controller 108. The displacement controller 108 carries out follow-up control on the displacements of the twelve joints of the arms of the robot 1, using the joint displacement commands (values) calculated by the robot geometric model 102 as the desired values.

A floor reaction force (specifically, an actual floor reaction force of each foot) generated in the robot 1 is detected by a 6-axis force sensor 34. The detected value is sent to the composite compliance operation determiner 104. Posture inclination errors θerrx and θerry (specifically, errors of actual posture angles relative to desired body posture angles, a posture angle error in the roll direction (about x-axis) being denoted by θerrx and a posture angle error in the pitch direction (about the y-axis) being denoted by θerry) that have occurred in the robot 1 are detected through the intermediary of an inclination sensor 36, and the detected values are sent to a posture stabilization control calculator 112. The posture stabilization control calculator 112 calculates a compensating total floor reaction force moment about the desired total floor reaction force central point (desired ZMP) for restoring the body posture angle of the robot 1 to the desired body posture angle, and sends the calculated value to the composite compliance operation determiner 104. The composite compliance operation determiner 104 corrects the desired floor reaction force on the basis of the input value. To be specific, the desired floor reaction force is corrected such that the compensating total floor reaction force moment acts about the desired total floor reaction force central point (desired ZMP).

The composite compliance operation determiner 104 determines the aforesaid corrected desired foot position/posture (trajectory) with deformation compensation such that the state and the floor reaction force of the actual robot calculated from the sensor detection values or the like agree with the corrected desired floor reaction force. Practically speaking, however, it is impossible to make all states agree with desired values, so that a tradeoff relationship is imparted among them to achieve maximized compromising agreement among them. More specifically, weights are imparted to the control errors of the desired values, and control is carried out to minimize the weighted average of control errors (or squared control errors). With this arrangement, the control is carried out such that actual foot position/posture and total floor reaction force approximately follow the desired foot position/posture and the desired total floor reaction force.

The subject matter of the present invention is the generation of gaits of the robot 1 in the gait generator 100, and the construction and the operation of the aforesaid composite compliance operation determiner 104 and the like are described in detail in, for example, Japanese Patent Laid-Open Publication No. H10-277969 previously applied by the present applicant, so that no further explanation will be given.

In the aforesaid embodiment, block diagrams, flowcharts, algorithms and the like may use equivalent transformations, such as different orders of arithmetic processing. Further, low-pass filters may be inserted, as necessary.

The aforesaid embodiment has been explained in relation to a bipedal mobile robot; however, the present invention can be also applied to a multi-leg robot having three or more feet.

The generation of a walking gait of the robot 1 will now be explained. The walking gait is a gait which includes no floating period and in which the one-leg supporting period and the two-leg supporting period are alternately repeated.

To generate a walking gait, the processing described below is carried out in S106 and S606. A floor reaction force vertical component trajectory is determined such that the amounts of characteristics, such as a phase and an amplitude, of a body vertical position trajectory (a body vertical position trajectory using, for example, the body height determining technique disclosed in Japanese Patent Laid-Open Publication No. H10-86080 by the present applicant) determined on the basis of a geometric condition (geometric restrictive condition) related to at least the displacements of the joints of the legs, such as whether knee bending angles are appropriate, are satisfied as much as possible.

Thus, the major part of algorithm for generating gaits can be shared among running and walking, so that it is possible to shift to running in the middle of walking or to shift to walking in the middle of running.

Figure 14:
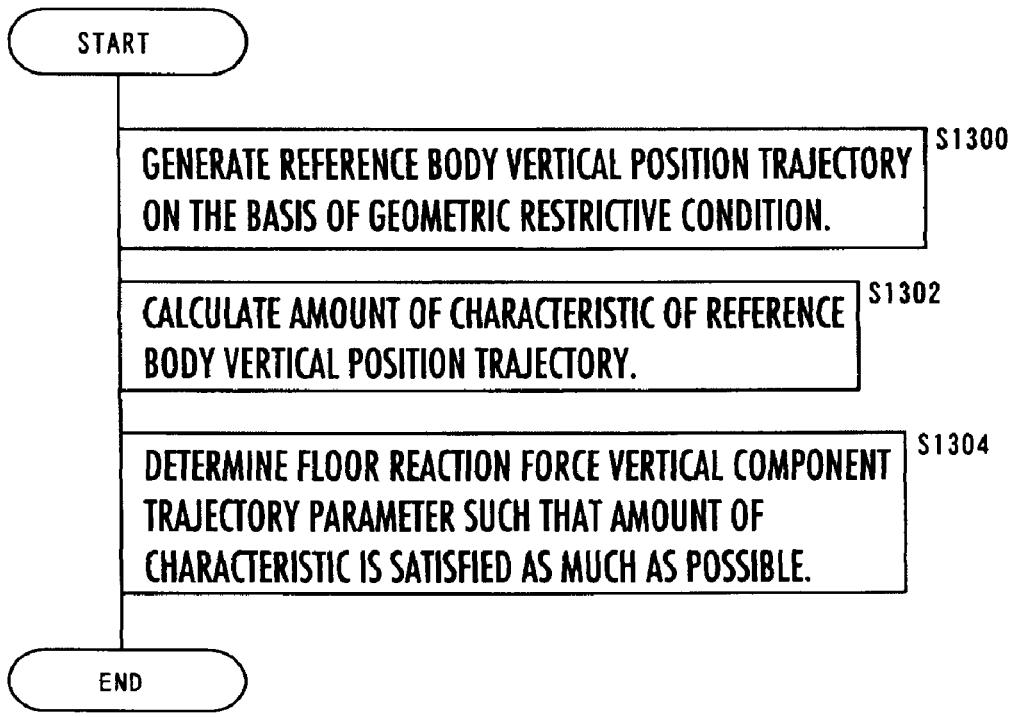
FIG. 14 is a flowchart illustrating the processing for setting the desired floor reaction force vertical component in the walking gait.

The processing will be explained in conjunction with FIG. 14. First, in S1300, a body vertical position trajectory that satisfies a predetermined geometric restrictive condition related to at least the displacements of the joints of the legs 2 is determined, using, for example, the body height determining method previously proposed in Japanese Patent Laid-Open Publication No. H10-86080 by the present applicant. Hereinafter, this will be referred to as the reference body vertical position trajectory. To be more specific, first, based on the foot trajectory parameters, the desired ZMP trajectory parameters and the like that have been determined on the basis of required parameters, a body horizontal position trajectory is determined, using the first embodiment of Japanese Patent Application No. 2000-352011 previously proposed by the present applicant. In this case, the body horizontal position trajectory is determined such that the floor reaction force vertical component agrees with the self-weight of the robot 1 and the horizontal component of a floor reaction force moment about a desired ZMP becomes zero, the body vertical position taking a preset constant value. The body posture trajectory at this time may be, for example, a trajectory of a constant posture (e.g., a vertical posture).

Subsequently, using the body height determining method previously proposed by the present applicant (Japanese Patent Laid-Open Publication No. H10-86080. More specifically, the technique shown in FIG. 6 of the Publication), a body vertical position trajectory is calculated on the basis of a foot trajectory determined by foot trajectory parameters, or the body horizontal position trajectory and the body posture trajectory determined as described above, and the calculated result is defined as the aforesaid reference body vertical position trajectory.

Subsequently, the procedure proceeds to S1302 to calculate (extract) the amounts of characteristics, such as an amplitude and a phase, of a reference body vertical position trajectory in order to determine a floor reaction force vertical component trajectory that makes it possible to generate a desired body vertical position trajectory that is similar to the reference body vertical position trajectory as much as possible. For instance, the amplitude (the difference between a minimum value and a maximum value) of the reference body vertical position trajectory is calculated as the amount of characteristic.

Figure 13:
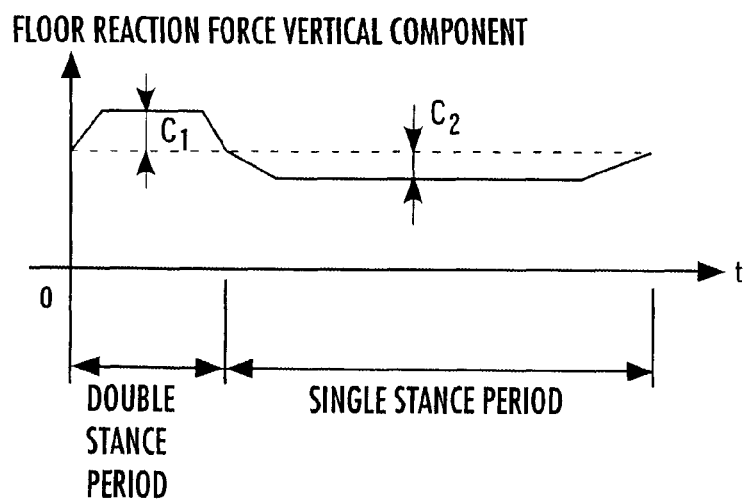
FIG. 13 is a chart showing a setting example of a desired floor reaction force vertical component in a walking gait.

Subsequently, the procedure proceeds to S1304 wherein the floor reaction force vertical component trajectory parameters (the time of break points and the value of a floor reaction force vertical component) are determined such that the body vertical position trajectory generated on the basis of the floor reaction force vertical component trajectory parameters can satisfy the aforesaid amount of characteristic as much as possible (presents a pattern similar to the aforesaid reference body vertical position trajectory as much as possible). To be more specific, in the case of a walking gait, the first turning gait and the second turning gait of a normal gait and the floor reaction force vertical component trajectory of a current time's gait are set to be like, for example, the broken-line pattern shown in FIG. 13. They are set to be shaped like a trapezoid bulging toward a floor reaction force vertical component increasing side (bulging upward) in a two-leg supporting period, while they are set to be shaped like a trapezoid bulging toward a floor reaction force vertical component decreasing side (bulging downward) in a one-leg supporting period. Then, floor reaction force vertical component trajectory parameters, such as heights C1 and C2 of the two trapezoids of the floor reaction force vertical component trajectory, are determined such that the difference between the maximum value and the minimum value of the body vertical position trajectory corresponding to the total center-of-gravity vertical position trajectory of the robot 1 obtained by subjecting the floor reaction force vertical component trajectory to second-order integration from the beginning of the gait (the start time of the two-leg supporting period) to the end thereof (the end time of the one-leg supporting period) agrees with the aforesaid amount of characteristic (in this example, the time of break points of the floor reaction force vertical component trajectory is determined on the basis of a required parameter related to a gait cycle).

However, the parameters of the floor reaction force vertical component trajectory of the normal gait are determined to also satisfy the following condition, as described above.

Condition) The mean value throughout a normal gait period (the period of both the first turning gait and the second turning gait) of a floor reaction force vertical component trajectory agrees with the self-weight of the robot. In other words, the mean value of the floor reaction force vertical components has the same magnitude as that of gravity acting on the robot and is in the opposite direction therefrom.

The parameters of a floor reaction force vertical component trajectory of the current time's gait are determined such that the body (total center-of-gravity) vertical position trajectory continuously connects or approaches to the normal gait, as previously described.

Thus, the desired floor reaction force vertical component trajectory (the parameters defining this) in the walking gait is determined. The processing for generating a gait other than the processing for determining the desired floor reaction force vertical component trajectory explained above may be the same as that in the embodiment related to the running gait described above.

As described above, the present invention is characterized in that a stable motion of the robot 1 is ensured by canceling a spin force, which is produced by motions of the lower body 241 or the legs 2 or the like, by to a twisting motion of the upper body 241 and the swinging motions of the arms 80. This aspect will be explained below (refer to S030, S031, and S032 in FIG. 8).

The control unit 26 causes the robot 1 to follow the instantaneous values of a desired gait determined in S030, S031, and S032. More specifically, the control unit 26 controls an motion of the robot 1, which includes the motions of the legs 2, the arms 80, the upper body 241, and the lower body 242, as shown in FIG. 15(a) to FIG. 15(e).

To be specific, during a period from the instant the left leg (a first leg) 2L becomes a free leg to the instant the left leg becomes a supporting leg, the left hip joint (the proximal portion of the first leg) 10L is moved to the front from the rear relative to the right hip joint (the proximal portion of a second leg) 10R, as illustrated in the order of FIG. 15(a), FIG. 15(b), FIG. 15(c), FIG. 15(d), and FIG. 15(e). Further, a left shoulder joint (the proximal portion of a first arm adjacent to the first leg) 82L is moved to the rear from the front relative to a right shoulder joint (the proximal portion of a second arm adjacent to the second leg) 82R. In addition, a left elbow joint (a first arm predetermined portion located farther toward the distal end than the proximal portion of a first arm is located) 86L is moved to the rear from the front relative to the left shoulder joint (the proximal portion of the first arm) 82L. Further, a right elbow joint (a second arm predetermined portion located farther toward the distal end than the proximal portion of a second arm is located) 86R is moved to the front from the rear relative to the right shoulder joint (the proximal portion of the second arm) 82R. Further, a left foot joint (a first leg predetermined portion located farther toward the distal end than the proximal portion of the first leg is located) 18L is moved to the front from the rear relative to the left hip joint (the proximal portion of the first leg) 10L. Further, a right foot joint (a second leg predetermined portion located farther toward the distal end than the proximal portion of the second leg is located) 18R is moved toward the rear from the front relative to the right hip joint (the proximal portion of the second leg) 10R.

Meanwhile, during a period from the instant the right leg (a first leg) 2R becomes a free leg to the instant the right leg becomes a supporting leg, the right hip joint (the proximal portion of the first leg) 10R is moved to the front from the rear relative to the left hip joint (the proximal portion of a second leg) 10L, as illustrated in the order of FIG. 15(e), FIG. 15(d), FIG. 15(c), FIG. 15(b), and FIG. 15(a). Further, a right shoulder joint (the proximal portion of the first arm adjacent to the first leg) 82R is moved to the rear from the front relative to a left shoulder joint (the proximal portion of the second arm adjacent to the second leg) 82L. In addition, a right elbow joint (a first arm predetermined portion located farther toward the distal end than the proximal portion of the first arm is located) 86R is moved to the rear from the front relative to the right shoulder joint (the proximal portion of the first arm) 82R. Further, a left elbow joint (a second arm predetermined portion located farther toward the distal end than the proximal portion of a second arm is located) 86L is moved to the front from the rear relative to the left shoulder joint (the proximal portion of the second arm) 82L. Further, a right foot joint (a first leg predetermined portion located farther toward the distal end than the proximal portion of the first leg is located) 18R is moved to the front from the rear relative to the right hip joint (the proximal portion of the first leg) 10R. Further, a left foot joint (a second leg predetermined portion located farther toward the distal end than the proximal portion of the second leg is located) 18L is moved toward the rear from the front relative to the left hip joint (the proximal portion of the second leg) 10L.

Thus, as the robot 1 runs, a relative position x(10) (solid line) in the longitudinal direction of the other hip joint that uses one hip joint of the left and right hip joints 10L and 10R as the reference position thereof, a relative position x(18) (dashed line) in the longitudinal direction of the other foot joint that uses one foot joint of the left and right foot joints 18L and 18R as the reference position thereof, a relative position x(82) (solid line) in the longitudinal direction of the other shoulder joint that uses one shoulder joint of the left and right shoulder joints 82L and 82R as the reference position thereof, and a relative possible x(86) (dashed line) in the longitudinal direction of the other elbow joint that uses one elbow joint of the left and right elbow joints 86L and 86R as the reference position thereof, respectively, periodically change as shown in FIG. 16.

Moreover, the motion of the robot 1 is controlled such that "the first ratio" increases as a desired value or a measured value of a traveling velocity of the robot 1 or a desired value or a measured value of a stride increases during the period from the instant the first leg becomes a free leg to the instant the first leg becomes a supporting leg. The "first ratio" is a ratio of the sum of a backward movement amount of the elbow joint, whose reference is the shoulder joint of the first arm, and the forward movement amount of the elbow joint, whose reference is the shoulder joint of the second arm, with respect to the backward movement amount of the shoulder joint of the first arm, whose reference is the shoulder joint of the second arm.

Further, the motion of the robot 1 is controlled such that "the second ratio" increases as a desired value or a measured value of a traveling velocity of the robot 1 or a desired value or a measured value of a stride increases during the period from the instant the first leg becomes a free leg to the instant the first leg becomes a supporting leg. The "second ratio" is a ratio of the sum of a forward movement amount of the foot joint, whose reference is the hip joint of the first leg, and the backward movement amount of the foot joint, whose reference is the hip joint of the second leg, with respect to the forward movement amount of the hip joint of the first leg, whose reference is the hip joint of the second leg.

In addition, the motion of the robot 1 is controlled such that the time point at which the first leg lands, the time point at which the longitudinal interval between the hip joint of the first leg and the hip joint of the second leg ($=|x(10)|$) reaches a maximum value (e.g., time t2 in FIG. 16), and the time point at which the longitudinal interval between the shoulder joint of the first arm and the shoulder joint of the second arm ($=|x(82)|$) reaches a maximum value (e.g., time t1 in FIG. 16) approach to each other.

Further, the motion of the robot 1 is controlled such that the time point at which the longitudinal interval between the shoulder joint of the first arm and the shoulder joint of the second arm (=|x(82)|) reaches a maximum value (e.g., time t1 in FIG. 16) and the time point at which the longitudinal interval between the elbow joint of the first arm and the elbow joint of the second arm (=|x(86)|) reaches a maximum value (e.g., time t1' in FIG. 16) approach to a first time interval T1.

Further, the motion of the robot 1 is controlled such that the time point at which the longitudinal interval between the hip joint of the first leg and the hip joint of the second leg (=|x(10)|) reaches a maximum value (e.g., time t2 in FIG. 16) and the time point at which the longitudinal interval between the foot joint of the first leg and the foot joint of the second leg (=|x(18)|) reaches a maximum value (e.g., time t2' in FIG. 16) approach to a second time interval T2.

In addition, the right and left arms 80 are bent at the elbow joints 86 such that the distance from the shoulder joint (proximal portion) 82 of each of the right and left arms 80 to the carpus joint 88 or the hand 89 (distal portion) decreases as a desired value or a measured value of a traveling velocity of the robot 1 or a desired value or a measured value of a stride increases.

When the robot 1 in a running mode is observed from the front in the advancing direction and from the right side, the changes illustrated in FIG. 17(a) to FIG. 17(h) and FIG. 18(a) to FIG. 18(h) take place as the control described above is conducted.

Figure 15:
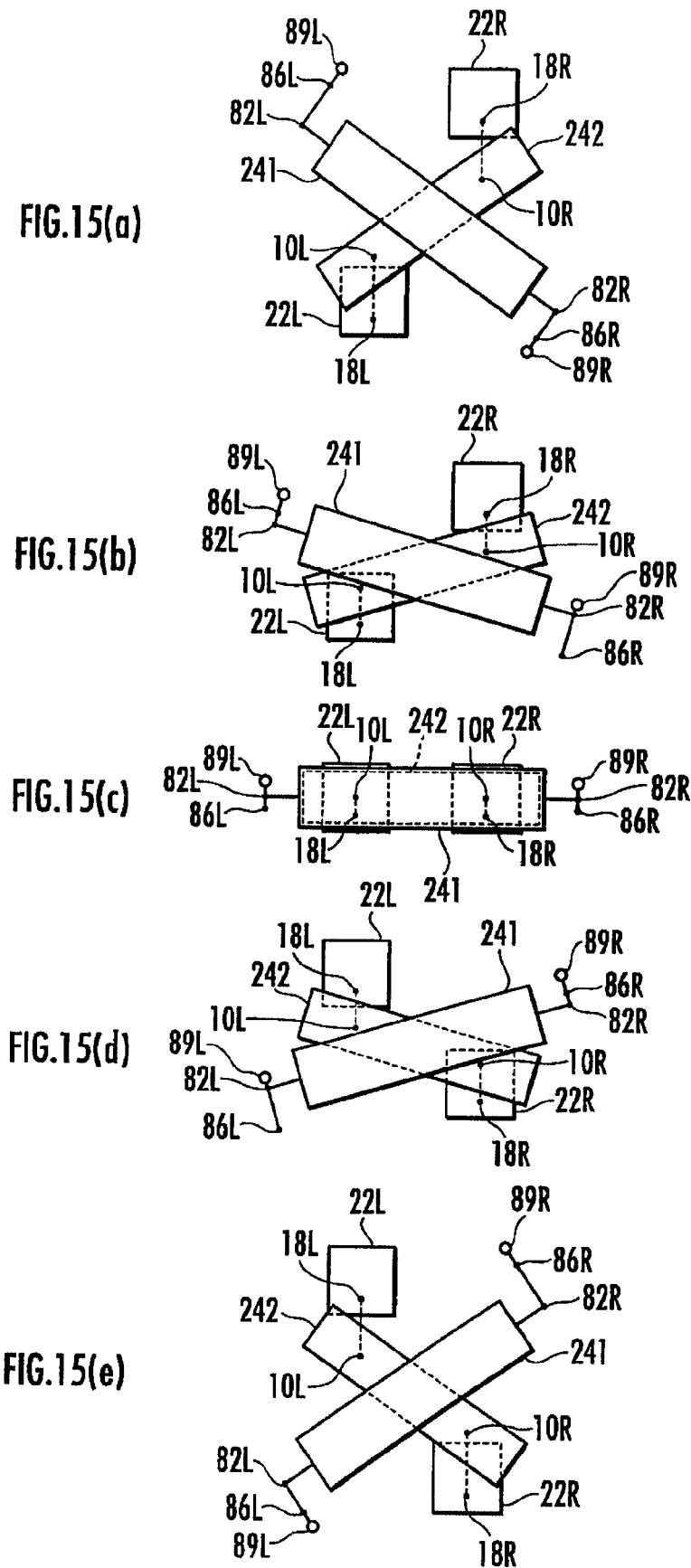
FIG. 15 provides motion explanatory diagrams of a legged mobile robot in accordance with the present invention.
Figure 18A:
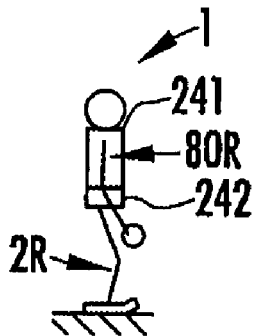
FIG. 18 provides motion explanatory diagrams of the legged mobile robot in accordance with the present invention.

When the robot 1 is standing as shown in FIG. 17(a) and FIG. 18(a), the longitudinal positions of both hip joints 10L and 10R are the same, and the longitudinal positions of both shoulder joints 82L and 82R are also the same (refer to FIG. 15(c)).

Figure 18B:
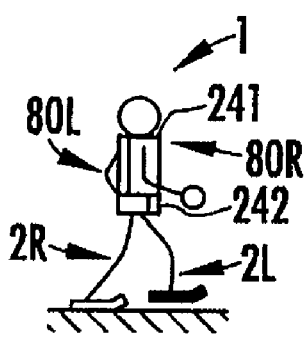
Figure 18C:
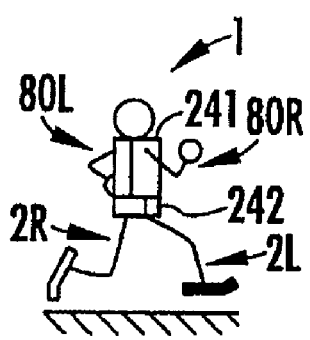
Figure 18D:
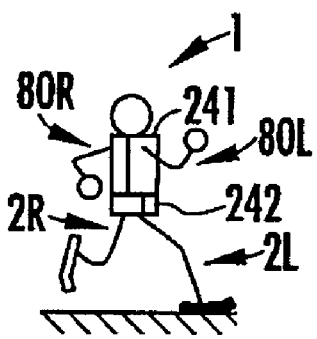

As the robot 1 starts running, the left leg 2L leaves the floor and is swung out forward, as shown in FIG. 17(b) and FIG. 18(b), the right leg 2R, in addition to the left leg 2L, also leaves the floor, as shown in FIG. 17(c) and FIG. 18(c), and then the left leg 2L lands onto the floor, as shown in FIG. 17(d) and FIG. 18(d). Thus, during the period from the instant the left leg 2L as the first leg becomes a free leg to the instant the left leg 2L becomes a supporting leg, the left hip joint (the proximal portion of the first leg) 10L is moved from the rear to the front in relation to the right hip joint (the proximal portion of the second leg) 10R. Further, the left foot joint (the first leg predetermined portion located farther toward the distal end than the proximal portion of the first leg is located) 18L is moved to the front from the rear relative to the left hip joint (the proximal portion of the first leg) 10L. Moreover, the right foot joint (the second leg predetermined portion located farther toward the distal end than the proximal portion of the second leg is located) 18R is moved to the rear from the front relative to the right hip joint (the proximal portion of the second leg) 10R (refer to FIGS. 15(d) and (e)).

Further, the left shoulder joint (the proximal portion of the first arm adjacent to the first leg) 82L is moved to the rear from the front relative to the right shoulder joint (the proximal portion of the second arm adjacent to the second leg) 82R. Further, the left elbow joint (the first arm predetermined portion located farther toward the distal end than the proximal portion of the first arm is located) 86L is moved to the rear from the front relative to the left shoulder joint (the proximal portion of the first arm) 82L. Moreover, the right elbow joint (the second arm predetermined portion located farther toward the distal end than the proximal portion of the second arm is located) 86L is moved to the front from the rear relative to the right shoulder joint (the proximal portion of the second arm) 82R (refer to FIGS. 15(d) and (e)). Thus, the lower body 242 twists clockwise, and the left leg (the first leg) 2L and the right leg (the second leg) 2R swing to the front and to the rear so as to follow the swing motion of the lower body 242, as observed from above the robot 1. Meanwhile, the upper body 241 twists counterclockwise, and the right arm 80R and the left arm 80L, which have bent at the elbow joints 86, swing to the front and to the rear so as to follow the twisting motion of the upper body 241.

Figure 18E:
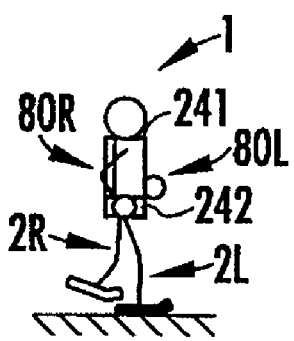
Figure 18F:
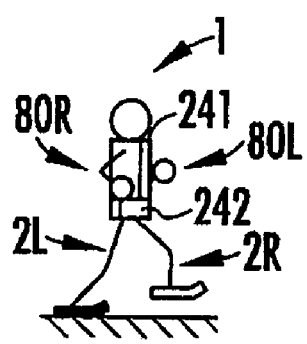
Figure 18G:
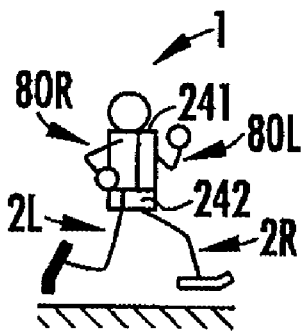
Figure 18H:
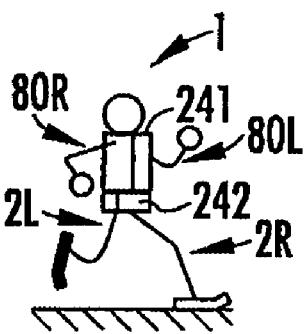

As the robot 1 runs thereafter, the states shown in FIG. 17(e) and FIG. 18(e) are observed, and the right leg 2R, which is apart from the floor, is swung out to the front, as shown in FIG. 17(f) and FIG. 18(f). Then, in addition to the right leg 2R, the left leg 2L also leaves the floor, as shown in FIG. 17(g) and FIG. 18(g), and then the right leg 2R lands onto the floor, as shown in FIG. 17(h) and FIG. 18(h). Thus, during the period from the instant the right leg 2R as the first leg becomes a free leg to the instant the right leg 2R becomes a supporting leg, the right hip joint (the proximal portion of the first leg) 10R is moved from the rear to the front in relation to the left hip joint (the proximal portion of the second leg) 10L. Further, the right foot joint (the first leg predetermined portion located farther toward the distal end than the proximal portion of the first leg is located) 18R is moved to the front from the rear relative to the right hip joint (the proximal portion of the first leg) 10R. Moreover, the left foot joint (the second leg predetermined portion located farther toward the distal end than the proximal portion of the second leg is located) 18L is moved to the rear from the front relative to the left hip joint (the proximal portion of the second leg) 10L (refer to FIGS. 15(a) and (b)).

Further, the right shoulder joint (the proximal portion of the first arm adjacent to the first leg) 82R is moved to the rear from the front relative to the left shoulder joint (the proximal portion of the second arm adjacent to the second leg) 82L. Further, the right elbow joint (the first arm predetermined portion located farther toward the distal end than the proximal portion of the first arm is located) 86R is moved to the rear from the front relative to the right shoulder joint (the proximal portion of the first arm) 82R. Moreover, the left elbow joint (the second arm predetermined portion located farther toward the distal end than the proximal portion of the second arm is located) 86L is moved to the front from the rear relative to the left shoulder joint (the proximal portion of the second arm) 82L (refer to FIGS. 15(a) and (b)). Thus, the lower body 242 twists counterclockwise, and the right leg (the first leg) 2R and the left leg (the second leg) 2L swing to the front and to the rear so as to follow the turning motion of the lower body 242, as observed from above the robot 1. Meanwhile, the upper body 241 twists clockwise, and the right arm 80R and the left arm 80L, which have bent at the elbow joints 86, swing to the front and to the rear so as to follow the twisting motion of the upper body 241.

In the aforesaid example, the explanation has been given to the running operation, which includes the floating period in which the right and left legs 2 are apart from a floor, as shown in FIG. 17(c), FIG. 18(c), FIG. 17(g), and FIG. 18(g). However, the motions of the robot 1 are controlled in the same manner for a walking mode, which does not include the floating period.

According to the robot 1 in accordance with the present invention, the motion of the robot 1 is controlled such that the time point t2 at which the longitudinal interval |X(10)| between the hip joint of the first leg and the hip joint of the second leg reaches a maximum value and the time point t2' at which the longitudinal interval |X(18)| between the foot joint of the first leg and the foot joint of the second leg reaches a maximum value approximate to the second time interval (which can be set to an infinitesimal value in the vicinity of zero) T2 (refer to FIG. 16). Further, the motion of the robot 1 is controlled such that the second ratio increases as a desired value or a measured value of the traveling velocity of the robot 1 or a desired value or a measured value of a stride increases. Thus, when the lower body 242 is twisted so that the right hip joint 10R moves to the front from the rear relative to the left hip joint 10L, the right leg 2R is swung forward so as to follow the twisting motion (refer to FIGS. 15(a) and (b)). Similarly, when the lower body 242 is twisted so that the left hip joint 10L moves to the front from the rear relative to the right hip joint 10R, the left leg 2L is swung forward so as to follow the twisting motion (refer to FIGS. 15(d) and (e)). The amount of swing of the leg increases as a desired value or a measured value of a traveling velocity of the robot 1 or a desired value or a measured value of a stride increases. Hence, it is possible to increase the stride of the robot 1 as a desired value or a measured value of the traveling velocity of the robot 1 or a desired value or a measured value of a stride increases, thereby making the motion of the robot 1 suited for fast walking or running.

Further, the motion of the robot 1 is controlled such that, during a period from the instant the first leg becomes a free leg to the instant the first leg becomes a supporting leg, the hip joint of the first leg moves to the front from the rear relative to the hip joint of the second leg, and the shoulder joint of the first arm moves to the rear from the front relative to the shoulder joint of the second arm. This causes the upper body 241 and the lower body 242 to twist in opposite directions from each other during the period.

Further, the motion of the robot 1 is controlled such that the shoulder joint of the first arm moves to the rear from the front relative to the shoulder joint of the second arm, the elbow joint of the first arm moves to the rear from the front relative to the shoulder joint, and the elbow joint of the second arm moves to the front from the rear relative to the shoulder joint. In addition, the motion of the robot 1 is controlled such that the time point t1 at which the longitudinal interval |x(82)| between the shoulder joint of the first arm and the shoulder joint of the second arm reaches a maximum value and the time point t1' at which the longitudinal interval |x(86)| between the elbow joint of the first arm and the elbow joint of the second arm reaches a maximum value approximate to the first time interval T1 (which can be set to an infinitesimal value in the vicinity of zero). Thus, when the upper body 241 is twisted so that the left shoulder joint 82L moves to the front from the rear relative to the right shoulder joint 82R, the left arm 80L is swung forward and the right arm 80R is swung backward so as to follow the twisting motion (refer to FIGS. 15(a) and (b)). Similarly, when the upper body 241 is twisted so that the right shoulder joint 82R moves to the front from the rear relative to the left shoulder joint 82L, the right arm 80R is swung forward and the left arm 80L is swung backward so as to follow the twisting motion (refer to FIGS. 15(d) and (e)). Hence, the left and right arms 80L and 80R perform swinging motions such that they produce a moment in the same direction as that of the twisting motion of the upper body 241.

Thus, a part of the moment produced by the twisting motion of the lower body 242 and the swinging motions of the legs 2 is cancelled by the moment produced by the twisting motion of the upper body 241 relative to the lower body 242 and the swinging motions of the arms 80 during the period from the instant the first leg becomes a free leg to the instant the first leg becomes a supporting leg, making it possible to securely prevent the robot 1 from spinning even after the first leg becomes the supporting leg. Moreover, the stable motions of the robot 1 can be maintained even when the robot 1 walks rapidly or runs as described above.

Further, the motion of the robot 1 is controlled such that, as a desired value or a measured value of a traveling velocity of the robot 1 or a desired value or a measured value of a stride increases during a period from the instant the first leg becomes a free leg to the instant the first leg becomes a supporting leg, the first ratio increases during the period (refer to FIGS. 15(a), (b), (d) and (e)). This makes it possible to securely cancel a moment, which is generated by the twisting motion of the lower body 242 and the swinging motion of the legs 2 as the robot 1 rapidly walks or runs, by a moment generated by the twisting motion of the upper body 241 relative to the lower body 242 and the swinging motions of the arms 80, while restraining the lateral wobble of the upper body 241 at the same time.

Further, the right and left arms 80 are bent at the elbow joints 86 such that the distance from the shoulder joint 82 of each of the right and left arms 80 to the carpus joint 88 or the hand 89 decreases as a desired value or a measured value of a traveling velocity of the robot 1 or a desired value or a measured value of a stride increases. Thus, burdens on the proximal portions of the arms 80 attributable to increased motion velocities of the right and left arms 80 can be reduced, the stability of the driving system of the arms 80 can be secured, and the motions of the robot 1 can be stably controlled.

Further, the motion of the robot 1 is controlled such that the time point t1' at which the longitudinal interval |x(82)| between the shoulder joint of the first arm and the shoulder joint of the second arm reaches a maximum value and the time point t1' at which the longitudinal interval |x(86)| between the elbow joint of the first arm and the elbow joint of the second arm reaches a maximum value approach to the first time interval T1. Thus, setting the first time interval T1 on the basis of a traveling mode, including a traveling velocity and a stride, of the robot 1 allows the motions of the robot 1 to be properly controlled from a viewpoint of, for example, bringing the movements of the upper body 241 and the arms 80 of the robot 1 close to the movements of the upper body of a human being.

Further, the motion of the robot 1 is controlled such that the time point t2 at which the longitudinal interval |X(10)| between the hip joint of the first leg and the hip joint of the second leg reaches a maximum value and a time point t2' at which the longitudinal interval δX(18) between the foot joint of the first leg and the foot joint of the second leg reaches a maximum value approach to the second time interval T2. Thus, setting the second time interval T2 on the basis of a traveling mode, including a traveling velocity and a stride, of the robot 1 allows the motions of the robot 1 to be properly controlled from a viewpoint of, for example, bringing the movements of the lower body 242 and the legs 2 of the robot 1 close to the movements of the lower body of a human being.

Further, according to the robot 1 in accordance with the present invention, the motion of the robot 1 is controlled such that the time point at which the first leg lands, the time point t2 at which the longitudinal interval |x(10)| between the hip joint of the first leg and the hip joint of the second leg reaches a maximum value, and the time point t1 at which the longitudinal interval |x(82)| between the shoulder joint of the first arm and the shoulder joint of the second arm reaches a maximum value approach to each other. Thus, the motion of the robot 1 is controlled such that the turning direction of the lower body 242 and the turning direction of the upper body 241 are changed when the first leg lands. This makes it possible to cancel a moment generated primarily by a twisting motion of the lower body 242 or the upper body 241 when the leg 2 lands, and consequently to further securely cancel a spin force that may be generated when the robot 1 lands.

The same technique as that applied to traveling forward can be used to cancel spinning when the robot 1 travels backward or sideways, in addition to traveling forward.

The invention claimed is:

1. A legged mobile robot which comprises upper and lower bodies relatively turnable about a vertical axis, right and left arms extended from both right and left sides of the upper body, and right and left legs extended downward from the lower body, and the robot advancing by moving a first leg predetermined portion, the first leg predetermined portion located farther toward a distal end than a proximal portion of a first leg is located, to the front from the rear relative to the proximal portion of the first leg and also by moving a second leg predetermined portion, the second predetermined leg portion located farther toward the distal end than the proximal portion of a second leg is located, to the rear from the front of the proximal portion of the second leg during a period from the instant the first leg becomes a free leg to the instant the first leg becomes a supporting leg, wherein a motion is controlled such that the proximal portion of the first leg is moved to the front from the rear of the proximal portion relative to the second leg, a proximal portion of a first arm adjacent to the first leg is moved to the rear from the front of a proximal portion of a second arm adjacent to the second leg, a first arm predetermined portion, the first arm predetermined portion located farther toward a distal end than the proximal portion of the first arm is located, is moved to the rear from the front of the proximal portion of the first arm, and a second arm predetermined portion, the second arm predetermined portion located farther toward a distal end than the proximal portion of the second arm is located, is moved to the front from the rear relative to the proximal portion of the second arm during a period from the instant the first leg becomes a free leg to the instant the first leg becomes a supporting leg.

2. The legged mobile robot according to claim 1, wherein a motion is controlled such that, as the traveling velocity or the stride of the robot during the period from the instant the first leg becomes a free leg to the instant the first leg becomes a supporting leg increases, a first ratio increases during the period, the first ratio being the ratio of the sum of the amount of backward movement of the first arm predetermined portion, whose reference is the proximal portion of the first arm, and the amount of forward movement of the second arm predetermined portion, whose reference is the proximal portion of the second arm, with respect to the amount of backward movement of the proximal portion of the first arm, whose reference is the proximal portion of the second arm.

3. The legged mobile robot according to claim 2, wherein a motion is controlled such that, as the traveling velocity or the stride of the robot during the period from the instant the first leg becomes a free leg to the instant the first leg becomes a supporting leg increases, a second ratio increases during the period, the second ratio being the ratio of the sum of the amount of forward movement of the first leg predetermined portion, whose reference is the proximal portion of the first leg, and the amount of backward movement of the second leg predetermined portion, whose reference is the proximal portion of the second leg, relative to the amount of forward movement of the proximal portion of the first leg, whose reference is the proximal portion of the second leg.

4. The legged mobile robot according to claim 1, wherein the right and left arms are bent such that the distance from the proximal portion to the distal portion of each of the right and left arms is reduced as the traveling velocity or the stride of the robot increases.

5. The legged mobile robot according to claim 1, wherein a motion is controlled such that a time point at which the longitudinal interval between the proximal portion of the first arm and the proximal portion of the second arm reaches a maximum value and a time point at which the longitudinal interval between the first arm predetermined portion and the second arm predetermined portion reaches a maximum value approximate to a first time interval.

6. The legged mobile robot according to claim 1, wherein a motion is controlled such that a time point at which the longitudinal interval between the proximal portion of the first leg and the proximal portion of the second leg reaches a maximum value and a time point at which the longitudinal interval between the predetermined portion of the first leg and the predetermined portion of the second leg reaches a maximum value approximate to a second time interval.

7. The legged mobile robot according to claim 1, wherein a motion is controlled such that a time point at which the first leg lands, a time point at which the longitudinal interval between the proximal portion of the first leg and the proximal portion of the second leg reaches a maximum value, and a time point at which the longitudinal interval between the proximal portion of the first arm and the proximal portion of the second arm reaches a maximum value agree with each other.

8. A control program which imparts a function for controlling a legged mobile robot, which comprises upper and lower bodies relatively turnable about a vertical axis, right and left arms extended from both right and left sides of the upper body, and right and left legs extended downward from the lower body, and the robot advancing by moving a first leg predetermined portion located farther toward the distal end than the proximal portion of a first leg is located, to the front from the rear relative to the proximal portion of the first leg and also by moving a second leg predetermined portion located farther toward the distal end than the proximal portion of a second leg is located, to the rear from the front of the proximal portion of the second leg during a period from the instant the first leg becomes a free leg to the instant the first leg becomes a supporting leg, the function being imparted to a computer mounted on the robot, and the control program imparting:

a function for controlling a motion of the robot such that a proximal portion of a first leg is moved to the front from the rear relative to a proximal portion of a second leg, a proximal portion of a first arm adjacent to the first leg is moved to the rear from the front of a proximal portion of a second arm adjacent to the second leg, a first arm predetermined portion, the first arm predetermined portion located farther toward a distal end than the proximal portion of the first arm is located, is moved to the rear from the front of the proximal portion of the first arm, and a second arm predetermined portion, the second arm predetermined portion located farther toward a distal end than the proximal portion of the second arm is located, is moved to the front from the rear relative to the proximal portion of the second arm during a period from the instant the first leg becomes a free leg to the instant the first leg becomes a supporting leg, to a computer mounted on the robot.

9. The control program according to claim 8, which imparts, to a computer mounted on the robot, a function for controlling a motion of the robot such that, as the traveling velocity or the stride of the robot during the period from the instant the first leg becomes a free leg to the instant the first leg becomes a supporting leg increases, a first ratio increases during the period, the first ratio being the ratio of the sum of the amount of backward movement of the first arm predetermined portion, whose reference is the proximal portion of the first arm, and the amount of forward movement of the second arm predetermined portion, whose reference is the proximal portion of the second arm, relative to the amount of backward movement of the proximal portion of the first arm, whose reference is the proximal portion of the second arm.

10. The control program according to claim 9, which imparts, to a computer mounted on the robot, a function for controlling a motion of the robot such that, as the traveling velocity or the stride of the robot during the period from the instant the first leg becomes a free leg to the instant the first leg becomes a supporting leg increases, a second ratio increases during the period, the second ratio being the ratio of the sum of the amount of forward movement of the first leg predetermined portion, whose reference is the proximal portion of the first leg, and the amount of backward movement of the second leg predetermined portion, whose reference is the proximal portion of the second leg, relative to the amount of forward movement of the proximal portion of the first leg, whose reference is the proximal portion of the second leg.

11. The control program according to claim 8, which imparts, to a computer mounted on the robot, a function for controlling a motion of the robot such that the right and left arms are bent so that the distance from the proximal portion to the distal portion of each of the right and left arms is reduced as the traveling velocity or the stride of the robot increases.

12. The control program according to claim 8, which imparts, to a computer mounted on the robot, a function for controlling a motion of the robot such that a time point at which the longitudinal interval between the proximal portion of the first arm and the proximal portion of the second arm reaches a maximum value and a time point at which the longitudinal interval between the first arm predetermined portion and the second arm predetermined portion reaches a maximum value approximate to a first time interval.

13. The control program according to claim 8, which imparts, to a computer mounted on the robot, a function for controlling a motion of the robot such that a time point at which the longitudinal interval between the proximal portion of the first leg and the proximal portion of the second leg reaches a maximum value and a time point at which the longitudinal interval between the predetermined portion of the first leg and the predetermined portion of the second leg reaches a maximum value approximate to a second time interval.

14. The control program according to claim 8, which imparts, to a computer mounted on the robot, a function for controlling a motion of the robot such that a time point at which the first leg lands, a time point at which the longitudinal interval between the proximal portion of the first leg and the proximal portion of the second leg reaches a maximum value, and a time point at which the longitudinal interval between the proximal portion of the first arm and the proximal portion of the second arm reaches a maximum value agree with each other.

* * * * *

UNITED STATES PATENT AND TRADEMARK OFFICE
CERTIFICATE OF CORRECTION

PATENT NO.         : 7,801,643 B2
APPLICATION NO.    : 11/719163
DATED              : September 21, 2010
INVENTOR(S)        : Takenaka et al.

It is certified that error appears in the above-identified patent and that said Letters Patent is hereby corrected as shown below:

On the Title Page, item [74], under "Assistant Examiner", in Column 2, Line 1, delete "Howerda" and insert -- Holwerda --

Signed and Sealed this
Eighteenth Day of January, 2011

David J. Kappos
*Director of the United States Patent and Trademark Office*